US011567621B2

(12) United States Patent
Lee et al.

(10) Patent No.: US 11,567,621 B2
(45) Date of Patent: Jan. 31, 2023

(54) DISPLAY PANEL, MOBILE TERMINAL AND METHOD FOR CONTROLLING MOBILE TERMINAL

(71) Applicant: BOE TECHNOLOGY GROUP CO., LTD., Beijing (CN)

(72) Inventors: Chungchun Lee, Beijing (CN); Li Zhou, Beijing (CN); Liye Duan, Beijing (CN); Feng Jiang, Beijing (CN); Xuan He, Beijing (CN); Long Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 274 days.

(21) Appl. No.: 16/848,562

(22) Filed: Apr. 14, 2020

(65) Prior Publication Data

US 2020/0241707 A1 Jul. 30, 2020

Related U.S. Application Data

(63) Continuation-in-part of application No. 15/114,045, filed as application No. PCT/CN2016/070476 on Jan. 8, 2016, now abandoned.

(30) Foreign Application Priority Data

Aug. 4, 2015 (CN) .......................... 201510472732.5

(51) Int. Cl.
G06F 3/0481 (2022.01)
G06F 3/0487 (2013.01)
(Continued)

(52) U.S. Cl.
CPC .......... *G06F 3/0481* (2013.01); *G06F 3/0487* (2013.01); *G06F 3/04883* (2013.01); *G06F 2203/04806* (2013.01); *H04M 1/0281* (2013.01)

(58) Field of Classification Search
CPC .. G06F 3/0481; G06F 3/0487; G06F 3/04883; G06F 2203/04806; H04M 1/0281
See application file for complete search history.

(56) References Cited

U.S. PATENT DOCUMENTS 8,350,827 B2 1/2013 Chung et al.
8,411,057 B2 4/2013 Takahashi
(Continued)

FOREIGN PATENT DOCUMENTS

CN 103024156 A 4/2013
CN 103376972 A 10/2013
(Continued)

OTHER PUBLICATIONS

International Search Report and Written Opinion (including English translation of Box V) dated Mar. 24, 2016, for corresponding PCT Application No. PCT/CN2016/070476.
(Continued)

*Primary Examiner* — Daniel Samwel
(74) *Attorney, Agent, or Firm* — Kinney & Lange, P.A.

(57) ABSTRACT

Embodiments of the present disclosure provide a display panel, a mobile terminal and a method for controlling a mobile terminal which may allow a user to perform single hand operations on a large-size mobile terminal to improve the convenience of the mobile terminal. The display panel includes: a first substrate; a second substrate arranged opposite to the first substrate; and a single hand operation sensing unit arranged on the first substrate or the second substrate, which is configured to sense a single hand holding operation of a user and to trigger the display panel to demagnify an operation graphic interface displayed in full-screen and display the demagnified operation graphic interface in a predetermined single hand operation comfortable region
(Continued)

positioned on the basis of a holding position in case that the single hand holding operation of the user is sensed.

19 Claims, 11 Drawing Sheets

(51) Int. Cl.
*G06F 3/04883* (2022.01)
*H04M 1/02* (2006.01)

(56) References Cited

U.S. PATENT DOCUMENTS

| | | | |
|---|---|---|---|
| 8,896,576 | B2 | 11/2014 | Miyazaki et al. |
| 8,910,079 | B2 | 12/2014 | Yoo |
| 8,982,072 | B2 | 3/2015 | Sim et al. |
| 9,013,397 | B2 | 4/2015 | Hiramoto |
| 9,268,482 | B2 | 2/2016 | Wei et al. |
| 9,285,919 | B2 | 3/2016 | Chihara |
| 9,292,191 | B2 | 3/2016 | Kim et al. |
| 9,335,861 | B2 | 5/2016 | Shin et al. |
| 9,529,490 | B2 | 12/2016 | Li |
| 9,588,603 | B2 | 3/2017 | Shiomi |
| 9,851,883 | B2 | 12/2017 | Terrero et al. |
| 2003/0218175 | A1* | 11/2003 | Ogawa ............ H01L 31/02327 257/E31.128 |
| 2006/0044429 | A1* | 3/2006 | Toda ............... G01J 3/2823 348/E9.003 |
| 2008/0074401 | A1* | 3/2008 | Chung ............. G02F 1/1368 345/175 |
| 2011/0012852 | A1* | 1/2011 | Takahashi ........ G06F 1/1601 349/158 |
| 2013/0300697 | A1* | 11/2013 | Kim .............. G06F 1/1637 345/173 |
| 2014/0109022 | A1* | 4/2014 | Wei .............. G06F 3/04886 715/863 |
| 2014/0176503 | A1 | 6/2014 | Guo |
| 2014/0375582 | A1 | 12/2014 | Park et al. |
| 2015/0145772 | A1 | 5/2015 | Chien |
| 2015/0205522 | A1 | 7/2015 | Zeng |
| 2015/0234581 | A1* | 8/2015 | Terrero .......... G06F 3/04886 715/863 |
| 2016/0041674 | A1 | 2/2016 | Xia et al. |

FOREIGN PATENT DOCUMENTS

| | | |
|---|---|---|
| CN | 103513865 A | 1/2014 |
| CN | 103530049 A | 1/2014 |
| CN | 103635873 A | 3/2014 |
| CN | 103870034 A | 6/2014 |
| CN | 103885642 A | 6/2014 |
| CN | 103914258 A | 7/2014 |
| CN | 104267544 A | 1/2015 |
| CN | 104298392 A | 1/2015 |
| CN | 104571919 A | 4/2015 |
| CN | 104598123 A | 5/2015 |
| CN | 104765541 A | 7/2015 |
| CN | 105183273 A | 12/2015 |
| KR | 20130059123 A | 6/2013 |
| KR | 20140061042 A | 5/2014 |

OTHER PUBLICATIONS

First Chinese Office Action, for Chinese Patent Application No. 201510472732.5, dated Oct. 11, 2017, 20 pages.
Second Chinese Office Action, for Chinese Patent Application No. 201510472732.5, dated May 16, 2018.
Extended European Search Report dated Feb. 5, 2019, received for corresponding European Application No. 16738348.8.
Examination report dated Nov. 12, 2020 for corresponding European Application No. 16738348.8.
Bergstrom-Lehtovirta and Oulasvirta, "Modeling the Functional Area of the Thumb on Mobile Touchscreen Surfaces", Session: Understanding and Modeling Touch, CHI 2014, One of a CHInd, Toronto, ON, Canada.
Karlson and Bederson, "ThumbSpace: Generalized One-Handed Input for Touchscreen-Based Mobile Devices",INTERACT 2007, LNCS 4662, Part I, pp. 324-338, 2007.
European Examination Report dated Jun. 3, 2020, for corresponding European Application No. 16 738 348.8.

* cited by examiner

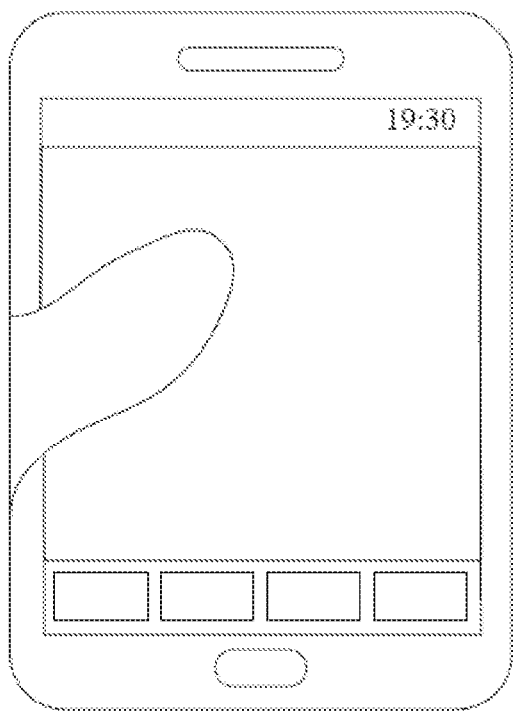

Fig. 16

| sensing a single hand operation signal by a mobile terminal, the single hand operation signal being triggered by an operation of a user holding the mobile terminal by single hand | S101 |

↓

| demagnifying an operation graphic interface displayed in full screen to one in a predetermined single hand operation comfortable region by the mobile terminal in response to the single hand operation signal, the predetermined single hand operation comfortable region being positioned on the basis of a position at which the user holds the display panel | S102 |

↓

| displaying the demagnified operation graphic interface in the single hand operation comfortable region by the mobile terminal | S103 |

↓

| recovering the full screen display of the operation graphic interface from the demagnified operation graphic interface displayed in the single hand operation comfortable region by the mobile terminal in case that the mobile terminal detects a first event | S104 |

Fig. 17

DISPLAY PANEL, MOBILE TERMINAL AND METHOD FOR CONTROLLING MOBILE TERMINAL

CROSS-REFERENCE TO RELATED APPLICATION(S)

This application is a continuation-in-part of U.S. application Ser. No. 15/114,045 filed on Jul. 25, 2016, entitled "DISPLAY PANEL, MOBILE TERMINAL AND METHOD FOR CONTROLLING MOBILE TERMINAL," which in turn is a Section 371 National Stage Application of International Application No. PCT/CN2016/070476, filed on Jan. 8, 2016, entitled "DISPLAY PANEL, MOBILE TERMINAL AND METHOD FOR CONTROLLING MOBILE TERMINAL," which in turn claims benefit of Chinese Application No. 201510472732.5, filed with China National Intellectual Property Administration on Aug. 4, 2015, all of which are incorporated herein by reference in their entirety.

TECHNICAL FIELD

The present disclosure generally relates to the field of electronics, in particular, to a display panel, a mobile terminal and a method for controlling a mobile terminal.

BACKGROUND

As mobile communication technology develops, mobile terminals are used more and more widely, in particular large-size mobile terminals have become increased continuously.

At present, when a user needs to perform a certain operation on a large-size mobile terminal, both of his hands must be occupied, that is, one hand holds the mobile terminal while the other hand performs the operation on the mobile terminal. Or, the user needs to put the mobile terminal on a certain table and then perform the operation on the mobile terminal.

However, in some circumstances, the user needs to operate the above large-size mobile terminal by one hand, i.e., holds and operates the mobile terminal by only one hand. Due to limited one-handed operation range of the user, it becomes difficult for him to operate the large-size mobile terminal by one hand, and the user has to operate the mobile terminal by both hands, or has to put it on a certain table for operation. It may reduce the convenience of the mobile terminal in operation.

SUMMARY

Embodiments of the present disclosure provide a display panel, a mobile terminal and a method for controlling a mobile terminal, which may allow the user to perform one-handed operations on a large-size mobile terminal, so as to improve the convenience of the mobile terminal.

An embodiment of the present disclosure provides a display panel including: a first substrate; a second substrate arranged opposite to the first substrate; and a one-handed operation sensing unit arranged on the first substrate or the second substrate, wherein the one-handed operation sensing unit is configured to sense a one-handed holding operation of a user and to trigger the display panel to demagnify an operation graphic interface displayed in full-screen and to display the demagnified operation graphic interface in a predetermined one-handed operation comfortable region in case that the one-handed holding operation of the user is sensed, and wherein the one-handed operation comfortable region is positioned on the basis of a position at which the user holds the display panel.

In an embodiment, the first substrate includes a display region and a peripheral region outside of the display region, the one-handed operation sensing unit including a plurality of touch electrodes arranged in the peripheral region of the first substrate; or the second substrate includes a display region and a peripheral region outside of the display region, the one-handed operation sensing unit including a plurality of touch electrodes arranged in the peripheral region of the second substrate.

In an embodiment, the first substrate includes a display region and a peripheral region outside of the display region, the one-handed operation sensing unit including a plurality of infrared detection pixels arranged in the peripheral region of the first substrate; or the second substrate includes a display region and a peripheral region outside of the display region, the one-handed operation sensing unit including a plurality of infrared detection pixels arranged in the peripheral region of the second substrate.

In an embodiment, the first substrate includes a plurality of pixel units and the one-handed operation sensing unit includes an infrared detection pixel in each of the pixel units.

An embodiment of the present disclosure provides a mobile terminal including the display panel as described in any one of the above embodiments.

An embodiment of the present disclosure provides a mobile terminal including: a display panel; a cover plate arranged above the display panel; and a one-handed operation sensing unit arranged between the display panel and the cover plate, wherein the one-handed operation sensing unit is configured to sense a one-handed holding operation of a user and to trigger the display panel to demagnify an operation graphic interface displayed in full-screen and to display the demagnified operation graphic interface in a predetermined one-handed operation comfortable region in case that the one-handed holding operation of the user is sensed, and wherein the one-handed operation comfortable region is positioned on the basis of a position at which the user holds the display panel.

In an embodiment, the display panel includes a display region and a peripheral region outside of the display region and the one-handed operation sensing unit includes a plurality of touch electrodes which are arranged on a side of the cover plate facing the display panel and correspond to the peripheral region of the display panel.

In an embodiment, the display panel includes a display region and a peripheral region outside of the display region and the one-handed operation sensing unit includes a plurality of infrared transmitters and a plurality of infrared detectors which are arranged on a side of the cover plate facing the display panel and correspond to the peripheral region of the display panel, and wherein the cover plate has transparent parts at positions corresponding to the infrared transmitters and the infrared detectors.

In an embodiment, the infrared transmitters and the infrared detectors are arranged alternately.

An embodiment of the present disclosure provides a mobile terminal including: a display panel; a border arranged at peripheral side of the display panel; and a one-handed operation sensing unit arranged between the display panel and the border, wherein the one-handed operation sensing unit is configured to sense a one-handed holding operation of a user and to trigger the display panel to demagnify an operation graphic interface displayed in full-screen and to display the demagnified operation graphic interface in a predetermined one-handed operation comfortable region in case that the one-handed holding operation of the user is sensed, and wherein the one-handed operation comfortable region is positioned on the basis of a position at which the user holds the display panel.

In an embodiment, the one-handed operation sensing unit includes a plurality of infrared transmitters and a plurality of infrared detectors which are arranged on the border, and wherein the border has transparent parts at positions corresponding to the infrared transmitters and the infrared detectors.

In an embodiment, the infrared transmitters and the infrared detectors are arranged alternately.

An embodiment of the present disclosure provides a method for controlling a mobile terminal, including: sensing a one-handed operation signal by a mobile terminal, the one-handed operation signal being triggered by an operation of a user holding the mobile terminal by one-handed; demagnifying an operation graphic interface displayed in full screen to one in a predetermined one-handed operation comfortable region by the mobile terminal in response to the one-handed operation signal, the predetermined one-handed operation comfortable region being positioned on the basis of a position at which the user holds the display panel; and displaying the demagnified operation graphic interface in the one-handed operation comfortable region by the mobile terminal.

In an embodiment, demagnifying an operation graphic interface displayed in full screen to one in a predetermined one-handed operation comfortable region by the mobile terminal in response to the one-handed operation signal includes: deciding whether the one-handed operation signal is triggered by an operation of the user holding the mobile terminal by right hand or by an operation of the user holding the mobile terminal by left hand, by the mobile terminal in response to the one-handed operation signal; demagnifying an operation graphic interface displayed in full screen to one in the predetermined one-handed operation comfortable region corresponding to the right hand of the user by the mobile terminal, in case that the mobile terminal has decided the one-handed operation signal is triggered by an operation of the user holding the mobile terminal by right hand; and demagnifying an operation graphic interface displayed in full screen to one in the predetermined one-handed operation comfortable region corresponding to the left hand of the user by the mobile terminal, in case that the mobile terminal has decided the one-handed operation signal is triggered by an operation of the user holding the mobile terminal by left hand.

In an embodiment, the method further includes: recovering the full screen display of the operation graphic interface from the demagnified operation graphic interface displayed in the one-handed operation comfortable region by the mobile terminal in case that the mobile terminal detects a first event, wherein the first event is that the user completes respective operations in the demagnified operation graphic interface displayed in the one-handed operation comfortable region, or that the user holds the mobile terminal by both hands, or that the mobile terminal fails to sense the one-handed operation signal within a predetermined period.

Embodiments of the present disclosure provide a display panel, a mobile terminal and a method for controlling a mobile terminal. The display panel includes: a first substrate; a second substrate arranged opposite to the first substrate; and a one-handed operation sensing unit arranged on the first substrate or the second substrate, wherein the one-handed operation sensing unit is configured to sense a one-handed holding operation of a user and to trigger the display panel to demagnify an operation graphic interface displayed in full-screen and to display the demagnified operation graphic interface in a predetermined one-handed operation comfortable region in case that the one-handed holding operation of the user is sensed, and wherein the one-handed operation comfortable region is positioned on the basis of a position at which the user holds the display panel.

With the above technical solutions, the display panel provided by the embodiments of the present disclosure has a one-handed operation sensing unit arranged on a first substrate or a second substrate, thus, the one-handed operation sensing unit may trigger the display panel to demagnify an operation graphic interface displayed in full-screen and to display the demagnified operation graphic interface in a predetermined one-handed operation comfortable region when the one-handed holding operation of the user is sensed, and the one-handed operation comfortable region is positioned on the basis of a position at which the user holds the display panel. In this way, the user may operates the operation graphic interface in the one-handed operation comfortable region by one-handed such that the user one-handed operation may be performed on a large-size mobile terminal and the convenience of the mobile terminal may be improved.

BRIEF DESCRIPTION OF THE DRAWINGS

Figures associated with embodiments of the present disclosure or the prior art will below be explained briefly such that technical solutions of the embodiments of the present disclosure or the prior art may be described more clearly. Apparently, the following figures are only intended to describe some embodiments of the present disclosure. Other figures may be appreciated by the skilled person in the art from these figures.

FIG. 16 is a schematic view showing patterns of the thumb of the left hand of the user reflected on the mobile terminal;

FIG. 17 is a third schematic flow chart showing a method for controlling a mobile terminal according to an embodiment of the present disclosure;

DETAILED DESCRIPTION OF EMBODIMENTS

The technical solutions of embodiments of the present disclosure will be further explained explicitly and entirely below with reference to the figures therein. Apparently, the embodiments are only part of embodiments of the present disclosure, instead of all of embodiments. The display panel, the mobile terminal and the method for controlling the mobile terminal provided by embodiments of the present disclosure will below be described in detail with reference to figures. In addition, for the purpose of explanation, numerous specific details are set forth in the following detailed description to provide a thorough understanding to the embodiments of the present disclosure. It is obvious, however, that one or more embodiments can also be implemented without these specific details. In other instances, well-known structures and devices are shown in an illustrative manner so as to simplify the drawings.

Figure 1:
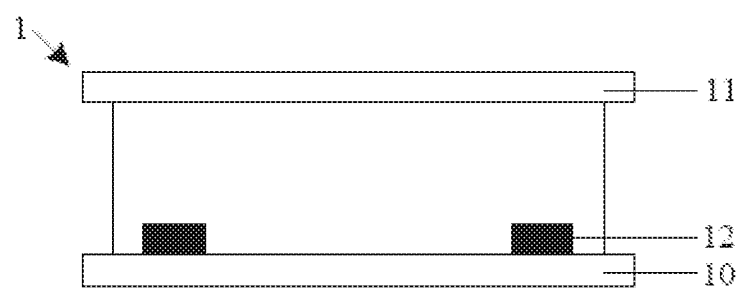
FIG. 1 is a first schematic view showing a structure of a display panel according to an embodiment of the present disclosure.

As illustrated in FIG. 1, an embodiment of the present disclosure provides a display panel 1. The display panel 1 includes a first substrate 10 and a second substrate 11 arranged opposite to the first substrate 10. The display panel 1 further includes a one-handed operation sensing unit 12 arranged on the first substrate 10 or the second substrate 11.

The one-handed operation sensing unit 12 is configured to sense a one-handed holding operation of a user and to trigger the display panel 1 to demagnify an operation graphic interface displayed in full-screen and to display the demagnified operation graphic interface in a predetermined one-handed operation comfortable region in case that the one-handed holding operation of the user is sensed, and the one-handed operation comfortable region is positioned on the basis of a position at which the user holds the display panel.

In an embodiment of the present disclosure, the display panel 1 as shown in FIG. 1 in which the one-handed operation sensing unit 12 is arranged on the first substrate 10 is only taken as an example for illustration. The structure of the one-handed operation sensing unit 12 arranged on the second substrate 11 is similar to that of the one-handed operation sensing unit 12 arranged on the first substrate 10. It may refer to the schematic view showing a structure of the display panel 1 shown in FIG. 1. The details will be omitted herein.

The display panel provided by the embodiments of the present disclosure may be used in a mobile terminal. When the user uses the mobile terminal, he may store a radius of the region which may be operated by a finger (typically thumb) if the mobile terminal is held by one-handed, into the mobile terminal in advance. In this way, when the user holds the mobile terminal by one-handed, if the one-handed operation sensing unit senses the user holding the mobile terminal by one-handed, the one-handed operation sensing unit may trigger the display panel to demagnify an operation graphic interface displayed in full-screen and to display the demagnified operation graphic interface in a predetermined one-handed operation comfortable region, and the one-handed operation comfortable region is positioned on the basis of a position at which the user holds the display panel, i.e., a position at which the user holds the display panel by one-handed.

In the present disclosure, the one-handed operation comfortable region positioned on the basis of a position at which the user holds the display panel may be understood as: a region being positioned on the basis of the position at which the user holds the display panel by one-handed and having a radius equal to a pre-stored radius of the region in which a finger is able to access when the mobile terminal is held by one-handed (for example, it may be a sector-like region, but embodiments of the present disclosure are not limited to this).

In an example, the position at which the user holds the mobile terminal by one-handed may be a central point of an intersection region of the base of the thumb of the user and the mobile terminal (including the intersection region for direct contact and the intersection region for indirect contact).

Figure 2:
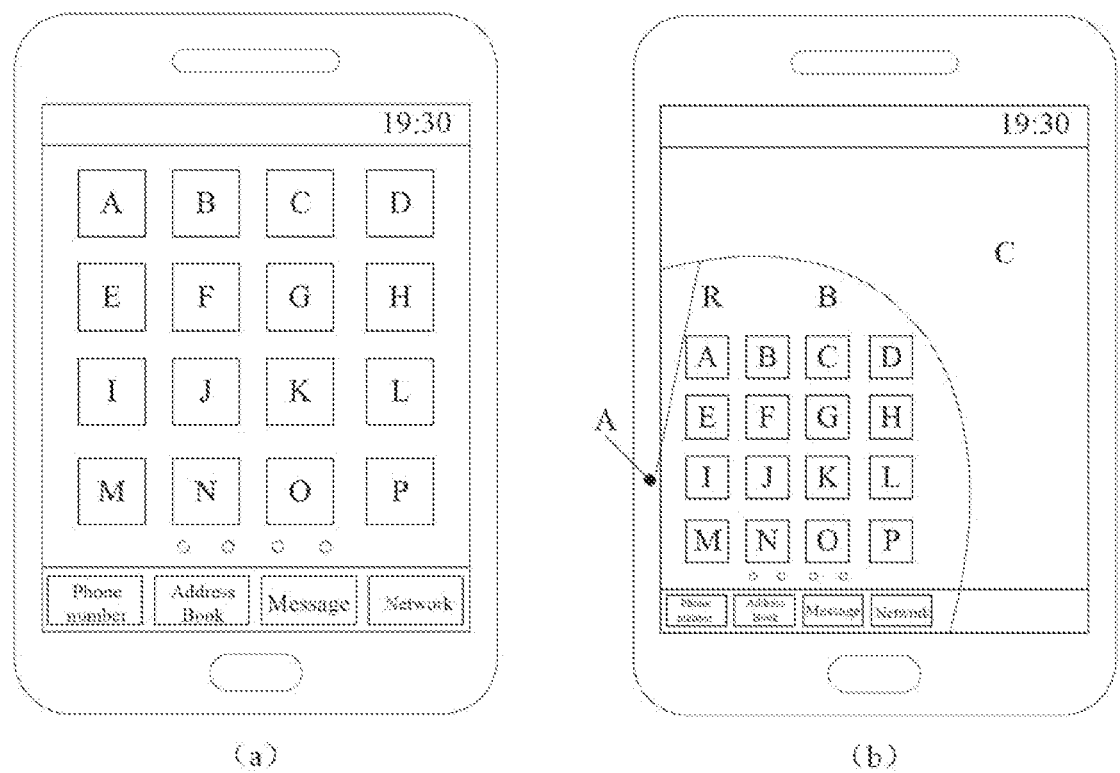
FIG. 2 is a schematic view showing a display panel on which an operation graphic interface is displayed according to an embodiment of the present disclosure.

As an example, FIG. 2 shows schematically an operation graphic interface displayed on the display panel. As shown in FIG. 2(a), the operation graphic interface is displayed in full-screen on the display panel. When the one-handed operation sensing unit senses the operation of the user holding the mobile terminal by one-handed, the one-handed operation sensing unit may trigger the display panel, that is, as shown in FIG. 2(b), the display panel is triggered by the one-handed operation sensing unit to detect the holding position A at which the user holds the mobile terminal and acquire the pre-stored radius R of the region in which a finger of the user is able to access when the mobile terminal is held by one-handed. In this way, the display panel may demagnify the operation graphic interface displayed in full screen and display the demagnified operation graphic interface to the one-handed operation comfortable region B being positioned on the basis of the holding position A and having a radius equal to the radius R. Thus, the display panel provided by the embodiment of the present disclosure may allow the user to operate on the operation graphic interface in the one-handed operation comfortable region by one-handed, such that the one-handed operation may be performed on the large-size mobile terminal to improve the convenience of the mobile terminal in operation.

The skilled person in the art would appreciate other regions on the display screen of the display panel except the one-handed operation comfortable region described by embodiments of the present disclosure may be called as one-handed operation uncomfortable region. For example, as illustrated in FIG. 2(b), on the display screen of the display panel, the region C other than the one-handed operation comfortable region B described by the embodiment of the present disclosure may be called as one-handed operation uncomfortable region.

Figure 3:
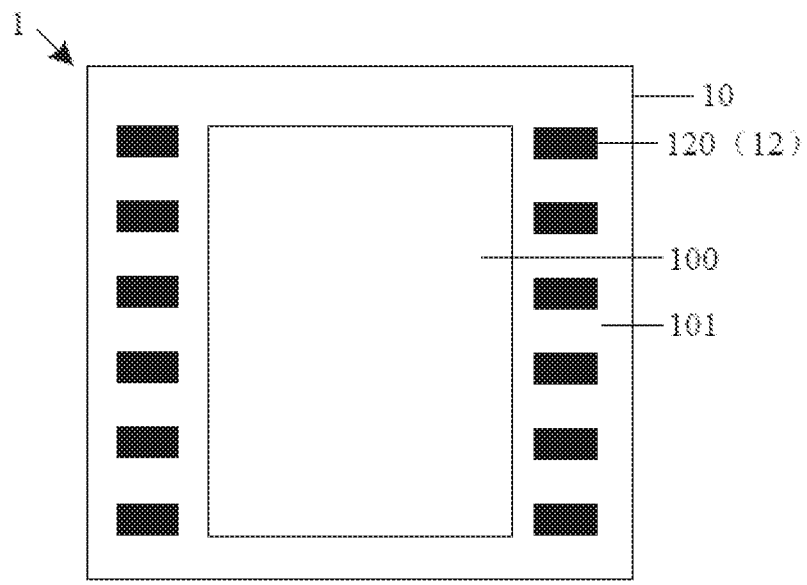
FIG. 3 is a second schematic view showing a structure of a display panel according to an embodiment of the present disclosure.

In an example, FIG. 3 is a schematic top view showing a structure of the display panel 1. With reference to FIG. 1, as shown in FIG. 3, the first substrate 10 includes a display region 100 and a peripheral region 101 outside of the display region 100. The one-handed operation sensing unit 12 includes a plurality of touch electrodes 120 arranged in the peripheral region 101 of the first substrate 10. Alternatively, as an example, the second substrate may include a display region and a peripheral region outside of the display region and the one-handed operation sensing unit may include a plurality of touch electrodes arranged in the peripheral region of the second substrate.

In an embodiment of the present disclosure, FIG. 3 only shows an example in which the one-handed operation sensing unit includes a plurality of touch electrodes arranged in the peripheral region of the first substrate. The structure in which the one-handed operation sensing unit includes a plurality of touch electrodes arranged in the peripheral region of the second substrate is similar to the structure in which the one-handed operation sensing unit includes a plurality of touch electrodes arranged in the peripheral region of the first substrate, in particular with reference to that shown in FIG. 3. The details of the structure in which the one-handed operation sensing unit includes a plurality of touch electrodes arranged in the peripheral region of the second substrate will be omitted herein.

In the embodiment of the present disclosure, the one-handed operation sensing unit may be arranged as touch electrodes and may detect whether the user holds the mobile terminal by one-handed with a touch principle.

In an example, the touch electrodes arranged in the peripheral region of the first substrate or the peripheral region of the second substrate may detect whether the user holds the mobile terminal by one-handed by detecting a one-handed operation signal triggered by the operation of the user holding the mobile terminal by one-handed (in the embodiment, the one-handed operation signal is a touch signal). As an example, when the user holds the mobile terminal by one-handed (i.e., left hand or right hand), the touch electrodes arranged in the peripheral region of the first substrate or in the peripheral region of the second substrate may detect the user to hold the mobile terminal by one-handed and the touch electrodes may trigger the display panel to demagnify the operation graphic interface displayed in full screen and to display the demagnified operation graphic interface in the one-handed operation comfortable region, and the one-handed operation comfortable region is positioned on the basis of a position at which the user holds the display panel and has a radius equal to a pre-stored radius of the region in which the user's finger is able to access when the mobile terminal is held by one-handed. In this way, the user may perform the one-handed operation on the operation graphic interface in the one-handed operation comfortable region, such that the user may operate the large-size mobile terminal by one-handed to improve the convenience of the mobile terminal.

It should be noted that the detailed description on actions of detecting whether the user holds the mobile terminal by one-handed and of demagnifying the operation graphic interface displayed in full screen and to display the demagnified operation graphic interface in the predetermined one-handed operation comfortable region being positioned on the basis of a position at which the user holds the display panel in response to the detection of the user holding the mobile terminal by one-handed, will be given with reference to the method for controlling the mobile terminal in the subsequent embodiments.

Figure 4:
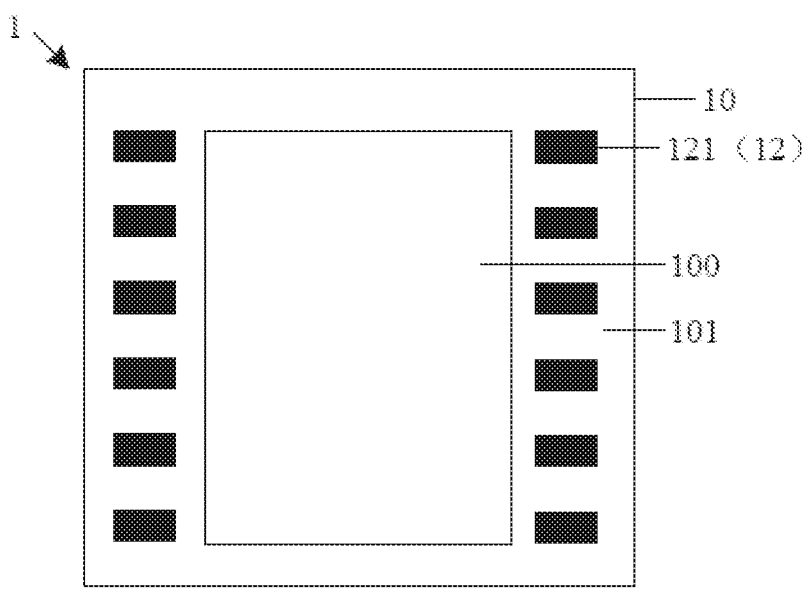
FIG. 4 is a third schematic view showing a structure of a display panel according to an embodiment of the present disclosure.

In an example, FIG. 4 is a schematic top view showing another structure of the display panel 1. With reference to FIG. 1, as shown in FIG. 4, the first substrate 10 includes a display region 100 and a peripheral region 101 outside of the display region 100, the one-handed operation sensing unit 12 including a plurality of infrared detection pixels 121 arranged in the peripheral region 101 of the first substrate 10. Or, as an example, the second substrate may also include a display region and a peripheral region outside of the display region, the one-handed operation sensing unit including a plurality of infrared detection pixels arranged in the peripheral region of the second substrate.

Figure 6:
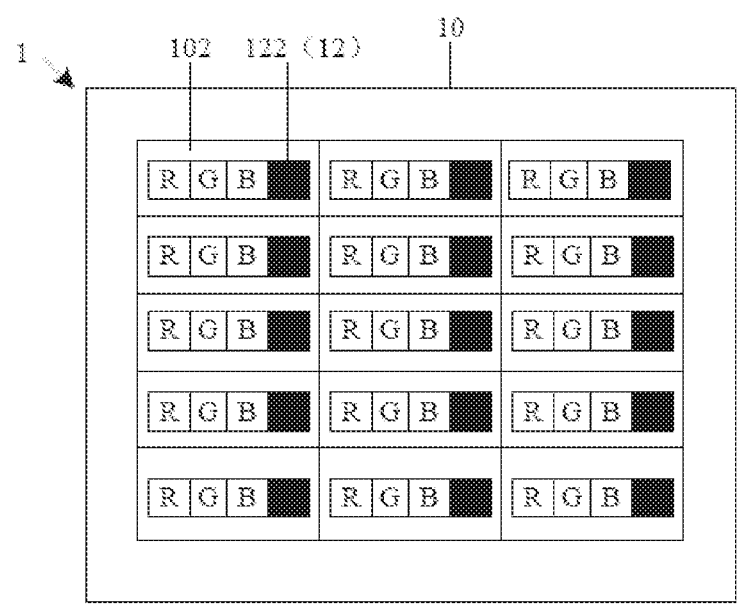
FIG. 6 is a fourth schematic view showing a structure of a display panel according to an embodiment of the present disclosure.

The structure of the infrared detection pixels in the embodiment is similar to the structure of the infrared detection pixels in the embodiment as shown in FIG. 6 and thus it may be understood with reference to the detailed description of the infrared detection pixels in the embodiment shown in FIG. 6 below.

In an embodiment of the present disclosure, FIG. 4 only shows an example in which the one-handed operation sensing unit includes a plurality of infrared detection pixels arranged in the peripheral region of the first substrate. The structure in which the one-handed operation sensing unit includes a plurality of infrared detection pixels arranged in the peripheral region of the second substrate is similar to the structure in which the one-handed operation sensing unit includes a plurality of infrared detection pixels arranged in the peripheral region of the first substrate, in particular with reference to that shown in FIG. 4. The details of the structure in which the one-handed operation sensing unit includes a plurality of infrared detection pixels arranged in the peripheral region of the second substrate will be omitted herein.

Figure 5:
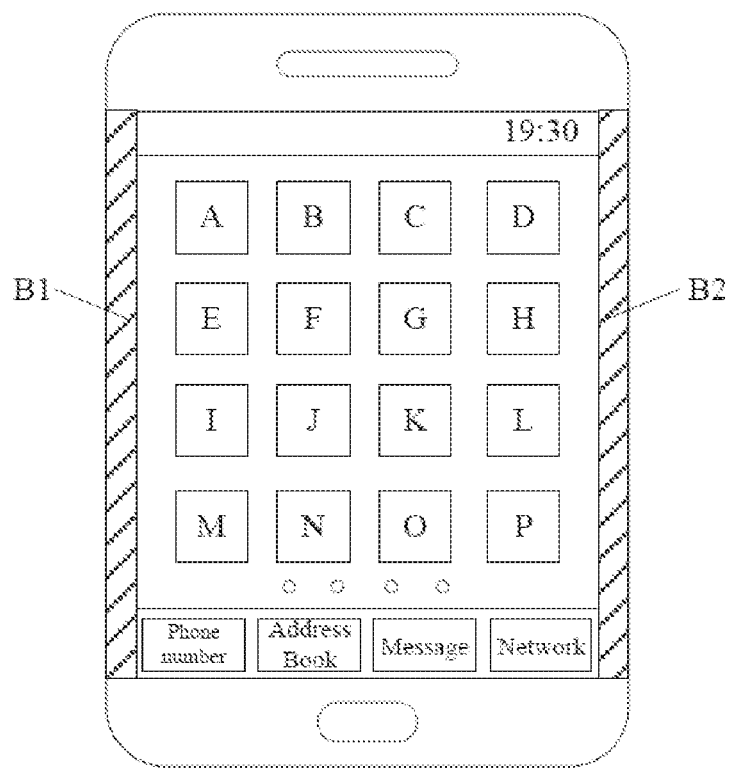
FIG. 5 is a schematic view showing a peripheral region of a display panel according to an embodiment of the present disclosure.

It should be noted that the peripheral region of the display panel provided by the embodiment of the present disclosure may include other regions on the display screen of the display panel other than the display region. Preferably, the peripheral region of the display panel according to the embodiment of the present disclosure may be peripheral regions on two sides of the display panel at which the user holds customarily when it is used in the mobile terminal. For example, the peripheral region of the display panel according to the embodiment of the present disclosure may be hatched parts, i.e., B1 region and B2 region, of the mobile terminal shown in FIG. 5.

In an example, FIG. 6 is a schematic top view showing another structure of the display panel 1. With reference to FIG. 1, as shown in FIG. 6, the first substrate 10 includes a plurality of pixel units 102 and the one-handed operation sensing unit 12 includes an infrared detection pixel 122 in each of the pixel units 102.

The structure of the infrared detection pixels in the embodiment shown in FIG. 4 is similar to the structure of the infrared detection pixels in the embodiment shown in FIG. 6. In particular, in the embodiment of the present disclosure, as the structure of the infrared detection pixel is similar to the structure of the display pixel in the pixel unit (for example, R (red), G (green) and B (blue) in FIG. 6, where R, G and B are sub-pixels in the pixel unit respectively) and the infrared detection pixel and the display pixel have similar manufacturing processes, the structure and manufacturing process of the infrared detection pixels may be found from the structure and manufacturing process of the display pixel in the prior art and thus the details of the structure and manufacturing process of the infrared detection pixels will be omitted herein. In addition, although the infrared detection pixel and the display pixel both have similar structure and manufacturing process, they have completely different functions from each other. In particular, for example, in an organic light emitting diode (OLED) display panel, combination of the electrons from the cathode of the display pixel and cavities from the anode of the display pixel in a light emitting layer of the display pixel may excite the light emitting layer to emit a light, that is, the display pixel converts an electrical signal into an optical signal to achieve light emission of the display pixel. In contrast, the infrared detection pixel contains a photoelectric conversion layer which may convert the optical signal entering the infrared detection pixel into an electrical signal, so as to detect the user holding the mobile terminal by the infrared detection pixel. In this way, the infrared detection pixel detects whether the user holds the mobile terminal by one-handed.

As an example, in an embodiment, it is assumed that the infrared detection pixel is composed of an anode, a P type cavity input layer, a cavity transmission layer, a photoelectric conversion layer, an exciton blocking layer, n type electron transmission layer and a cathode, and so on. In accordance with the black radiation principles, the human body may emit an infrared signal, i.e., infrared rays. Thus, the infrared detection pixel may detect the infrared ray emitted by the hand of the user (in one-handed operation, it may typically be the thumb of the user), and convert the infrared ray into a current signal. In this way, by means of process and decision of the respective units in the display panel, the infrared detection pixel may detect the user to hold the mobile terminal and detect whether the user holds the mobile terminal by one-handed.

The skilled person in the art would appreciate that when the first substrate is an array substrate, it includes a plurality of pixel units and the one-handed operation sensing unit includes the infrared detection pixel in each of the pixel units arranged on the first substrate and the second substrate is an opposite substrate. In contrast, when the second substrate is an array substrate, it includes a plurality of pixel units and the one-handed operation sensing unit includes the infrared detection pixel in each of the pixel units arranged on the second substrate and the first substrate is an opposite substrate. In particular, the structure of the first substrate used as the array substrate is similar to the structure of the second substrate used as the array substrate. The details of the structure of the second substrate will be omitted herein.

In the embodiment of the present disclosure shown in FIG. 6, the one-handed operation sensing unit and its arrangement are illustrated only with reference to the example in which the first substrate is the array substrate. When the second substrate is an array substrate, its one-handed operation sensing unit and its arrangement are similar to the one-handed operation sensing unit and its arrangement of the first substrate used as an array substrate, in particular as shown in FIG. 6. The details of the one-handed operation sensing unit and its arrangement of the second substrate as the array substrate will be omitted herein.

It should be noted that in the display panel described in the above embodiments, the one-handed operation sensing unit and its arrangement may be selected as required in practice. The present disclosure is not limited to this.

The display panel provided by the embodiment of the present disclosure may be a liquid crystal display panel, or may be an OLED display panel. However, the present disclosure is not limited by them. In an example, the liquid crystal display panel may be a twisted nematic (TN) display panel, an in-plane switching (IPS) display panel or an advanced super dimension switch (ADS) display panel.

An embodiment of the present disclosure provides a display panel including: a first substrate; a second substrate arranged opposite to the first substrate; and a one-handed operation sensing unit arranged on the first substrate or the second substrate. The one-handed operation sensing unit is configured to sense a one-handed holding operation of a user and to trigger the display panel to demagnify an operation graphic interface displayed in full-screen and to display the demagnified operation graphic interface in a predetermined one-handed operation comfortable region in case that the one-handed holding operation of the user is sensed, and the one-handed operation comfortable region is positioned on the basis of a position at which the user holds the display panel.

In the display panel provided by the embodiments of the present disclosure, the one-handed operation sensing unit is provided on the first substrate or the second substrate of the display panel. Thus, when the one-handed operation sensing unit senses the user holding the mobile terminal by one-handed, the one-handed operation sensing unit may trigger the display panel to demagnify an operation graphic interface displayed in full-screen and to display the demagnified operation graphic interface in a predetermined one-handed operation comfortable region, and the one-handed operation comfortable region is positioned on the basis of a position at which the user holds the display panel. In this way, the user may perform operations on the operation graphic interface in the one-handed operation comfortable region by one-handed, such that the one-handed operation of the user may be performed on the large-size mobile terminal to improve the convenience of the mobile terminal.

Figure 7:
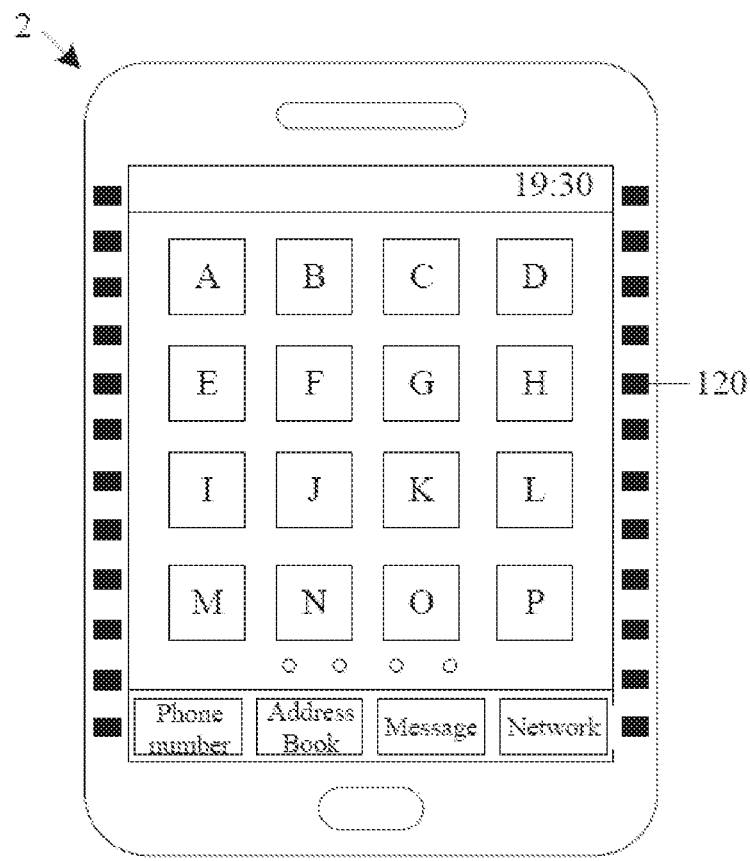
FIG. 7 is a first schematic view showing a structure of a mobile terminal according to an embodiment of the present disclosure.

As shown in FIG. 7, an embodiment of the present disclosure provides a mobile terminal 2 including the display panel as described in above embodiments. Further, the structure and associated description of the display panel as described in the above embodiments may be found from relative description with reference to FIGS. 1-6 in the above embodiments. The details of the structure and associated description of the display panel are omitted herein.

FIG. 7 only shows an example of the mobile terminal 2 in which the one-handed operation sensing unit in the display panel includes a plurality of touch electrodes 120 as shown in FIG. 3. When the one-handed operation sensing unit includes infrared detection pixels, the structure of the mobile terminal is similar to the structure of the mobile terminal shown in FIG. 7. In particular, it may be derived from the structure of the mobile terminal shown in FIG. 7 in combination with FIG. 4 or FIG. 6. The details of the structure are omitted herein.

The mobile terminal provided by the embodiment of the present disclosure may be an electronic apparatus which needs to be operated by one-handed such as a cell phone or a tablet computer, in particular, it may be a large-size electronic apparatus which needs to be operated by one-handed.

An embodiment of the present disclosure provides a mobile terminal. The mobile terminal includes a display panel. The display panel includes a first substrate and a second substrate arranged opposite to the first substrate. The display panel further includes a one-handed operation sensing unit arranged on the first substrate or the second substrate. The one-handed operation sensing unit is configured to sense a one-handed holding operation of a user and to trigger the display panel to demagnify an operation graphic interface displayed in full-screen and to display the demagnified operation graphic interface in a predetermined one-handed operation comfortable region in case that the one-handed holding operation of the user is sensed, and the one-handed operation comfortable region is positioned on the basis of a position at which the user holds the display panel.

In the mobile terminal provided by the embodiment of the present disclosure, the one-handed operation sensing unit is provided on the first substrate or the second substrate of the display panel. Thus, when the one-handed operation sensing unit senses the user holding the mobile terminal by one-handed, the one-handed operation sensing unit may trigger the display panel to demagnify an operation graphic interface displayed in full-screen and to display the demagnified operation graphic interface in a predetermined one-handed operation comfortable region, and the one-handed operation comfortable region is positioned on the basis of a position at which the user holds the display panel. In this way, the user may perform operations on the operation graphic interface in the one-handed operation comfortable region by one-handed, such that the one-handed operation of the user may be performed on the large-size mobile terminal to improve the convenience of the mobile terminal.

Figure 8:
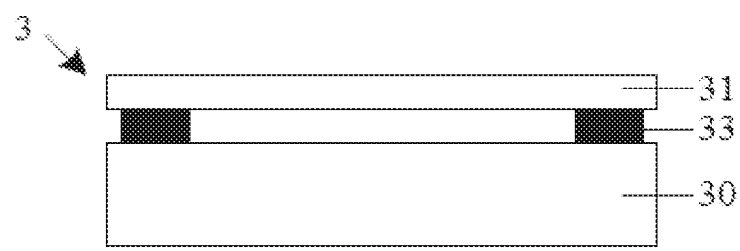
FIG. 8 is a second schematic view showing a structure of a mobile terminal according to an embodiment of the present disclosure.

As illustrated in FIG. 8, an embodiment of the present disclosure provides a mobile terminal 3. The mobile terminal 3 includes a display panel 30 and a cover plate 31 arranged above the display panel 30. The mobile terminal 3 further includes a one-handed operation sensing unit 33 arranged between the display panel 30 and the cover plate 31.

The one-handed operation sensing unit 33 is configured to sense a one-handed holding operation of a user and to trigger the display panel 30 to demagnify an operation graphic interface displayed in full-screen and to display the demagnified operation graphic interface in a predetermined one-handed operation comfortable region in case that the one-handed holding operation of the user is sensed, and wherein the one-handed operation comfortable region is positioned on the basis of a position at which the user holds the display panel.

In the mobile terminal provided by the embodiment of the present disclosure, the one-handed operation sensing unit is provided between the display panel and the cover plate of the mobile terminal. Thus, when the one-handed operation sensing unit senses the user holding the mobile terminal by one-handed, the one-handed operation sensing unit may trigger the display panel to demagnify an operation graphic interface displayed in full-screen and to display the demagnified operation graphic interface in a predetermined one-handed operation comfortable region, and the one-handed operation comfortable region is positioned on the basis of a position at which the user holds the display panel. In this way, the user may perform operations on the operation graphic interface in the one-handed operation comfortable region by one-handed, such that the one-handed operation of the user may be performed on the large-size mobile terminal to improve the convenience of the mobile terminal.

It should be noted that the detailed description of operations of the display panel magnifying the operation graphic interface displayed in full-screen and displaying the demagnified operation graphic interface in a predetermined one-handed operation comfortable region positioned on the basis of a position at which the user holds the display panel may follow the above relative description of the above embodiment shown in FIG. 2. The details are omitted herein.

Figure 9:
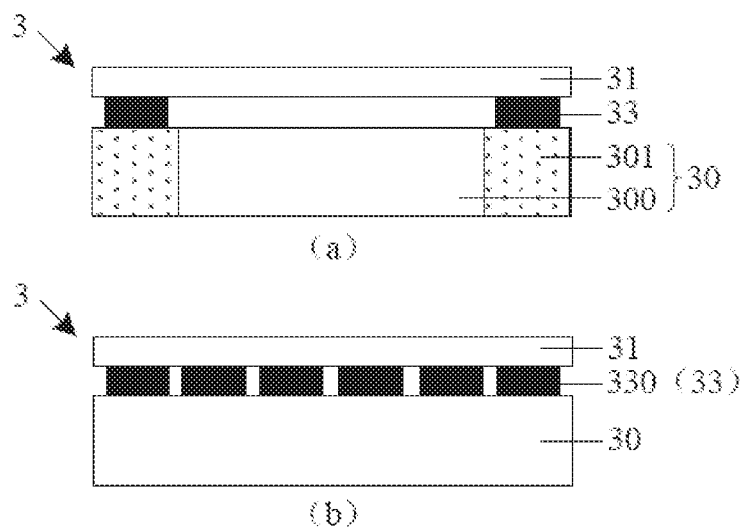
FIG. 9 is a third schematic view showing a structure of a mobile terminal according to an embodiment of the present disclosure.

In an example, as shown in FIG. 9, it shows a cross sectional schematic view of the mobile terminal 3. In the example, FIG. 9(a) is a front cross sectional schematic view of the mobile terminal 3 and FIG. 9(b) is a right cross sectional schematic view of the mobile terminal 3. With reference to FIG. 9(a) and FIG. 9(b), the display panel 30 includes a display region 300 and a peripheral region 301. The one-handed operation sensing unit 33 includes a plurality of touch electrodes 330 which are arranged on a side of the cover plate 31 facing the display panel and correspond to the peripheral region 301 of the display panel 30.

FIG. 9(b) only shows a right cross sectional schematic view of the mobile terminal 3 by way of an example. The left cross sectional schematic view of the mobile terminal 3 is similar to the right cross sectional schematic view of the mobile terminal 3 as shown in FIG. 9(b) and thus is omitted herein.

In the mobile terminal provided by the embodiment of the present disclosure, a plurality of touch electrodes may be provided on the cover plate of the mobile terminal, and then the cover plate provided with the touch electrodes is arranged on the display panel, so as to form the mobile terminal shown in FIG. 9.

In an example, the one-handed operation sensing unit in the embodiment of the present disclosure includes touch electrodes and may sense whether the user holds the mobile terminal by one-handed on the basis of the touch principle.

In particular, the touch electrodes arranged in the peripheral region of the display panel may detect a triggering signal triggered by the action of holding the mobile terminal by the user to detect whether the user holds the mobile terminal by one-handed. In an example, when the user holds the mobile terminal by one-handed (i.e., left hand or right hand), touch electrodes arranged in the peripheral region of the display panel may detect the user holding the mobile terminal by one-handed and the touch electrodes trigger the display panel to demagnify an operation graphic interface displayed in full-screen and to display the demagnified operation graphic interface in a one-handed operation comfortable region, and the one-handed operation comfortable region is positioned on the basis of a position at which the user holds the display panel and has a radius equal to a pre-stored radius of the region in which a finger (typically thumb) of the user is able to access when the mobile terminal is held by one-handed. In this way, the user may perform operations on the operation graphic interface in the one-handed operation comfortable region by one-handed, such that the one-handed operation of the user may be performed on the large-size mobile terminal to improve the convenience of the mobile terminal.

As an example, the mobile terminal shown in FIG. 9 may be a mobile terminal using 2.5D screen technology. In the mobile terminal using 2.5D screen technology, the touch electrodes may be arranged on the curved portion on the cover plate. In this way, when the user holds the mobile terminal by one-handed, the touch electrodes arranged on the curved portion on the cover plate may sense the user to hold the mobile terminal by one-handed.

Figure 10:
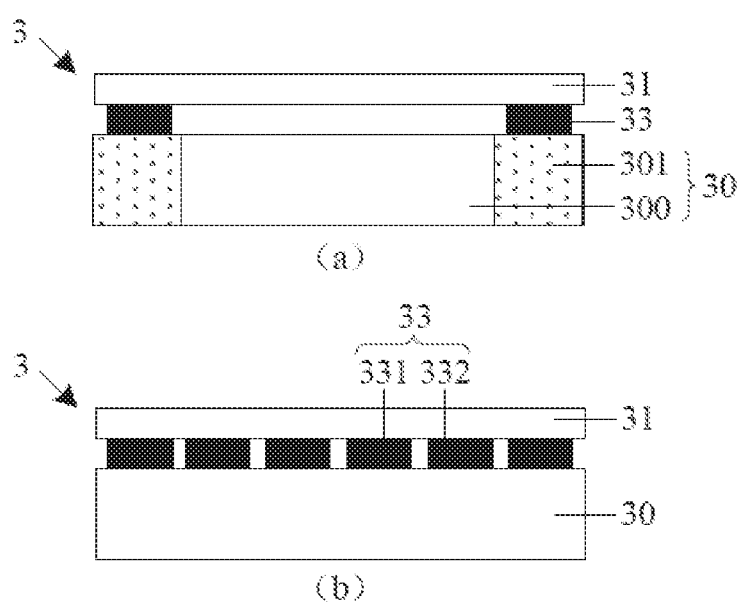
FIG. 10 is a fourth schematic view showing a structure of a mobile terminal according to an embodiment of the present disclosure.

In an example, as shown in FIG. 10, it shows a cross sectional schematic view of the mobile terminal 3. In the example, FIG. 10(a) is a front cross sectional schematic view of the mobile terminal 3 and FIG. 10(b) is a right cross sectional schematic view of the mobile terminal 3. With reference to FIG. 10(a) and FIG. 10(b), the display panel 30 includes a display region 300 and a peripheral region 301. The one-handed operation sensing unit 33 includes a plurality of infrared transmitters 331 and a plurality of infrared detectors 332 which are arranged on a side of the cover plate 31 facing the display panel and correspond to the peripheral region 301 of the display panel 30, and the cover plate 31 has transparent parts at positions corresponding to the infrared transmitters 331 and the infrared detectors 332.

FIG. 10(b) only shows a right cross sectional schematic view of the mobile terminal 3 by way of an example. The left cross sectional schematic view of the mobile terminal 3 is similar to the right cross sectional schematic view of the mobile terminal 3 in FIG. 10(b) and thus is omitted herein.

In the mobile terminal provided by the embodiment of the present disclosure, the plurality of infrared transmitters and the plurality of infrared detectors may be arranged on the cover plate of the mobile terminal, and then the cover plate provided with the plurality of infrared transmitters and the plurality of infrared detectors is arranged on the display panel, so as to form the mobile terminal shown in FIG. 10.

In an example, the one-handed operation sensing unit in the embodiment of the present disclosure is provided as the plurality of infrared transmitters and the plurality of infrared detectors and may sense whether the user holds the mobile terminal by one-handed on the basis of the infrared detection principle.

In particular, the plurality of infrared transmitters arranged in the peripheral region of the display panel may transmit infrared signals and when the user holds the mobile terminal, the infrared signals received by the thumb of the user may be reflected back to the display panel, such that the plurality of infrared detectors arranged in the peripheral region of the display panel receive the infrared signals reflected back to the display panel, i.e., the reflected infrared signals, and the display panel may analyze the reflected infrared signals to detect whether the user holds the mobile terminal by one-handed. For example, if the infrared detectors in the peripheral regions on two sides of the display panel (for example, the B1 region and B2 region shown in FIG. 5) both detect the reflected infrared signals, it will represent the user to hold the mobile terminal by both hands. If the infrared detectors in the peripheral regions only on one side of the display panel (for example, the B1 region or B2 region shown in FIG. 5) detect the reflected infrared signals, it will represent the user to hold the mobile terminal by one-handed. In particular, if the infrared detectors in the peripheral regions of the display panel corresponding to the left hand of the user (for example, the B1 region shown in FIG. 5) detect the reflected infrared signals, it will represent the user to hold the mobile terminal by the left hand; and if the infrared detectors in the peripheral regions of the display panel corresponding to the right hand of the user (for example, the B2 region shown in FIG. 5) detect the reflected infrared signals, it will represent the user to hold the mobile terminal by the right hand.

In an example, when the user holds the mobile terminal by one-handed (i.e., left hand or right hand), the plurality of infrared transmitters and the plurality of infrared detectors arranged in the peripheral region of the display panel may detect the user to hold the mobile terminal by one-handed and the plurality of infrared transmitters and the plurality of infrared detectors trigger the display panel to demagnify an operation graphic interface displayed in full-screen and to display the demagnified operation graphic interface in a one-handed operation comfortable region, and the one-handed operation comfortable region is positioned on the basis of a position at which the user holds the display panel and has a radius equal to a pre-stored radius of the region in which a finger (typically thumb) of the user is able to access when the mobile terminal is held by one-handed. In this way, the user may perform operations on the operation graphic interface in the one-handed operation comfortable region by one-handed, such that the one-handed operation of the user may be performed on the large-size mobile terminal to improve the convenience of the mobile terminal.

Typically, the cover plate is a transparent glass cover plate. However, during manufacturing the mobile terminal, in order to prevent the peripheral region of the display panel from leaking lights, photo resist material may be provided in position corresponding to the peripheral region of the display panel on the cover plate, so as to block the light from the peripheral region of the display panel. In the embodiment of the present disclosure, the infrared transmitters need to transmit infrared signals and the infrared detectors need to receive reflected infrared signals reflected by the external. Thus, in the embodiment of the present disclosure, transparent parts may be provided at positions on the cover plate corresponding to the infrared transmitters and the infrared detectors. In particular, openings or holes may be provided at the position on the photo resist corresponding to the infrared transmitters and the infrared detectors, or the photo resist material may have transparent portions at position corresponding to the infrared transmitters and the infrared detectors, and so on.

It should be noted that the peripheral region of the display panel in the mobile terminal provided by the embodiment of the present disclosure may include other regions on the display screen of the display panel other than the display region. Preferably, the peripheral region of the display panel according to the embodiment of the present disclosure may be peripheral regions on two sides of the display panel at which the user holds customarily when it is used in the mobile terminal. For example, the peripheral region of the display panel according to the embodiment of the present disclosure may be hatched parts (i.e., B1 region and B2 region) of the mobile terminal shown in FIG. 5.

In an example, the infrared transmitters and the infrared detectors are arranged alternately. In this way, it may ensure the infrared signals transmitted by each infrared transmitter will be received by the corresponding infrared detectors as long as they are received by the thumb of the user and then reflected back to the display panel, so as to enhance the accuracy of the infrared detection.

The mobile terminal provided by the embodiment of the present disclosure may be an electronic apparatus which needs to be operated by one-handed such as a cell phone or a tablet computer, in particular, it may be a large-size electronic apparatus which needs to be operated by one-handed.

Figure 11:
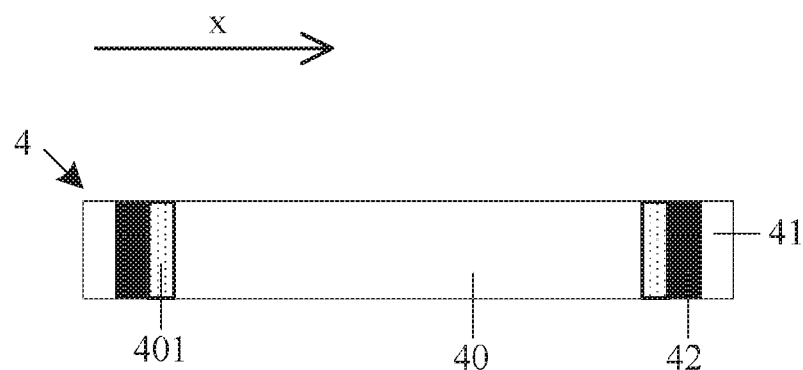
FIG. 11 is a fifth schematic view showing a structure of a mobile terminal according to an embodiment of the present disclosure.

As illustrated in FIG. 11, an embodiment of the present disclosure provides a mobile terminal 4. The mobile terminal 4 includes a display panel 40 and a border 41 arranged at peripheral side of the display panel 40. The mobile terminal 4 further includes a one-handed operation sensing unit 42 arranged between the display panel 40 and the border 41. As shown in FIG. 11, the one-handed operation sensing unit 42 is arranged on a side of the border 41, the side of the border 41 facing towards a side of the peripheral region 401 of the display panel 40, and the display panel 40, the one-handed operation sensing unit 42 and the border 41 are arranged in sequence along a direction (for example, the x direction in FIG. 11) parallel to a display surface of the display panel 40.

Figure 12A:
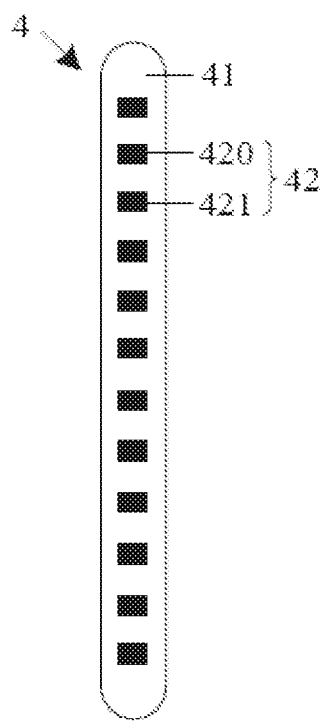
FIG. 12A is a sixth schematic view showing a structure of a mobile terminal according to an embodiment of the present disclosure.
Figure 12B:
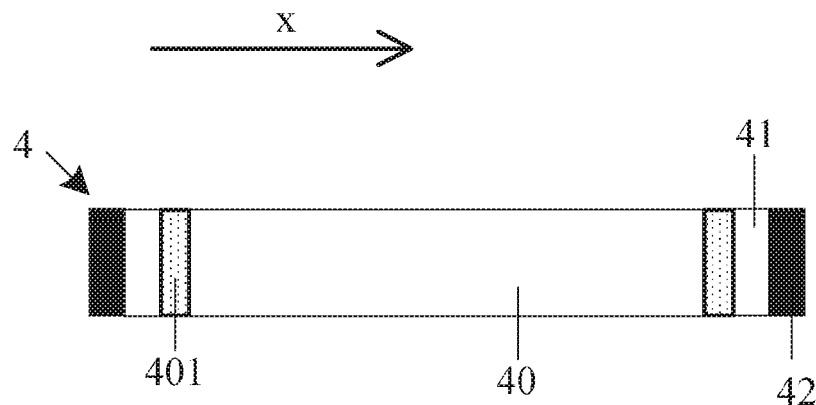
FIG. 12B is another schematic view showing a structure of a mobile terminal according to an embodiment of the present disclosure.

In another example, as shown in FIG. 12B, the one-handed operation sensing unit 42 may be arranged on a side of the border 41, the side of the border 41 facing away from a side of the display panel 40. The display panel 40, the border 41 and the one-handed operation sensing unit 42 are arranged in sequence along a direction (for example, the x direction in FIG. 12B) parallel to a display surface of the display panel 40.

The one-handed operation sensing unit 42 is configured to sense a one-handed holding operation of a user and to trigger the display panel 40 to demagnify an operation graphic interface displayed in full-screen and to display the demagnified operation graphic interface in a predetermined one-handed operation comfortable region in case that the one-handed holding operation of the user is sensed, and wherein the one-handed operation comfortable region is positioned on the basis of a position at which the user holds the display panel.

It should be noted that the detailed description of operations of the display panel magnifying the operation graphic interface displayed in full-screen and displaying the demagnified operation graphic interface in a predetermined one-handed operation comfortable region positioned on the basis of a position at which the user holds the display panel may follow the above relative description of the above embodiment shown in FIG. 2. The details are omitted herein.

In the mobile terminal provided by the embodiment of the present disclosure, the one-handed operation sensing unit is provided between the display panel and the border of the mobile terminal. Thus, when the one-handed operation sensing unit senses the user to hold the mobile terminal by one-handed, the one-handed operation sensing unit may trigger the display panel of the mobile terminal to demagnify an operation graphic interface displayed in full-screen and to display the demagnified operation graphic interface in a predetermined one-handed operation comfortable region, and the one-handed operation comfortable region is positioned on the basis of a position at which the user holds the display panel. In this way, the user may perform operations on the operation graphic interface in the one-handed operation comfortable region by one-handed, such that the one-handed operation of the user may be performed on the large-size mobile terminal to improve the convenience of the mobile terminal.

As an example, as shown in FIG. 12A, it shows a schematic view of the side structure of the mobile terminal 4. In FIG. 12, the one-handed operation sensing unit 42 includes a plurality of infrared transmitters 420 and a plurality of infrared detectors 421 which are arranged on the border 41. The border 41 has transparent parts at positions corresponding to the infrared transmitters 420 and the infrared detectors 421.

FIG. 12A only shows a schematic view of the side structure of the mobile terminal 4 by way of an example. The left side schematic view of the mobile terminal 4 is similar to the right side schematic view of the mobile terminal 4 as shown in FIG. 12A and thus is omitted herein.

In the mobile terminal provided by the embodiment of the present disclosure, the plurality of infrared transmitters and the plurality of infrared detectors may be arranged on the border of the mobile terminal, and then the border provided with the plurality of infrared transmitters and the plurality of infrared detectors is arranged around the display panel, so as to form the mobile terminal shown in FIG. 12.

In the embodiment, the principles for the infrared transmitters and the infrared detectors arranged on the border of the mobile terminal are similar to those for the infrared transmitters and the infrared detectors arranged on the cover plate in the mobile terminal as shown in FIG. 10. In particular, please see the above description of the principles for the infrared transmitters and the infrared detectors arranged on the cover plate in the mobile terminal as shown in FIG. 10. The detailed description of the above principles is omitted herein.

Typically, during manufacturing the mobile terminal, in order to prevent the peripheral region of the display panel from leaking lights, the border is typically made from the light shield material, so as to block the light from the peripheral region of the display panel. In the embodiment of the present disclosure, the infrared transmitters need to transmit infrared signals and the infrared detectors need to receive reflected infrared signals reflected by the external. Thus, in the embodiment of the present disclosure, transparent parts may be provided at positions in the border corresponding to the infrared transmitters and the infrared detectors. In particular, openings or holes may be provided at the position on the light shielding material corresponding to the infrared transmitters and the infrared detectors, or the light shielding material may have transparent portions at position corresponding to the infrared transmitters and the infrared detectors, and so on.

In an example, the infrared transmitters and the infrared detectors are arranged alternately. In this way, it may ensure the infrared signals transmitted by each infrared transmitter will be received by the corresponding infrared detectors as long as they are received by the thumb of the user and then reflected back to the display panel, so as to enhance the accuracy of the infrared detection.

An embodiment of the present disclosure also provides a mobile terminal, alternatively. The mobile terminal includes a display panel and a border arranged at peripheral side of the display panel. The mobile terminal further includes a one-handed operation sensing unit on the border.

The one-handed operation sensing unit is configured to sense a one-handed holding operation of a user and to trigger the display panel to demagnify an operation graphic interface displayed in full-screen and to display the demagnified operation graphic interface in a predetermined one-handed operation comfortable region in case that the one-handed holding operation of the user is sensed, and wherein the one-handed operation comfortable region is positioned on the basis of a position at which the user holds the display panel.

In the embodiment, the one-handed operation sensing unit may include a myoelectric sensing device provided onto the border. As an example, the myoelectric sensing device may include a plurality of micro myoelectric sensors, or any devices that can sense myoelectric signals of the user such as a myoelectric sensing membrane.

In the mobile terminal provided by the embodiment of the present disclosure, the one-handed operation sensing unit is provided on the border of the mobile terminal. Thus, when the one-handed operation sensing unit senses the user to hold the mobile terminal by one-handed, the one-handed operation sensing unit may trigger the display panel of the mobile terminal to demagnify an operation graphic interface displayed in full-screen and to display the demagnified operation graphic interface in a predetermined one-handed operation comfortable region, and the one-handed operation comfortable region is positioned on the basis of a position at which the user holds the display panel. In this way, the user may perform operations on the operation graphic interface in the one-handed operation comfortable region by one-handed, such that the one-handed operation of the user may be performed on the large-size mobile terminal to improve the convenience of the mobile terminal.

Figure 13:
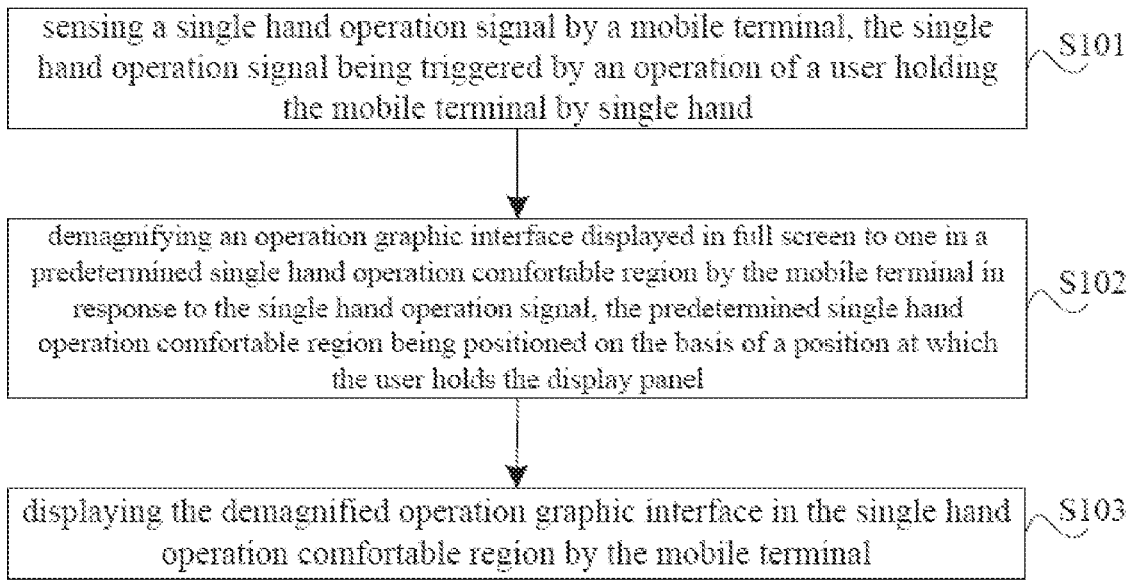
FIG. 13 is a first schematic flow chart showing a method for controlling a mobile terminal according to an embodiment of the present disclosure.

As shown in FIG. 13, an embodiment of the present disclosure provides a method for controlling a mobile terminal. The method may include:

S101: sensing a one-handed operation signal by a mobile terminal, the one-handed operation signal being triggered by an operation of a user holding the mobile terminal by one-handed;

S102: demagnifying an operation graphic interface displayed in full screen to one in a predetermined one-handed operation comfortable region by the mobile terminal in response to the one-handed operation signal, the predetermined one-handed operation comfortable region being positioned on the basis of a position at which the user holds the display panel; and S103: displaying the demagnified operation graphic interface in the one-handed operation comfortable region by the mobile terminal.

In an embodiment of the present disclosure, when the user uses the mobile terminal, he may store a radius of the region which may be operated by a finger (typically thumb) if the mobile terminal is held by one-handed, into the mobile terminal in advance. In this way, when the user holds the mobile terminal by one-handed, the mobile terminal may sense the one-handed operation signal triggered by an operation of a user holding the mobile terminal by one-handed and acquire the holding position at which the user holds the mobile terminal by one-handed from the one-handed operation signal and demagnify an operation graphic interface displayed by the mobile terminal and to display the demagnified operation graphic interface to the one-handed operation comfortable region being positioned on the basis of the holding position and having a radius equal to the pre-stored radius of the region in which a finger is able to access when the mobile terminal is held by one-handed. Thus, the display panel provided by the embodiment of the present disclosure may allow the user to operate on the operation graphic interface in the one-handed operation comfortable region by one-handed, such that the one-handed operation may be performed on the large-size mobile terminal to improve the convenience of the mobile terminal.

In the present disclosure, the one-handed operation comfortable region positioned on the basis of a position at which the user holds the display panel may be understood as a region being positioned on the basis of the position at which the user holds the display panel by one-handed and having a radius equal to a pre-stored radius of the region in which a finger is able to access when the mobile terminal is held by one-handed.

In an example, the position at which the user holds the mobile terminal by one-handed may be a central point of an intersection region of the base of the thumb of the user and the mobile terminal (including the intersection region for direct contact and the intersection region for indirect contact).

As an example, corresponding to the various implementations of the mobile terminal provided by the above embodiments, when the mobile terminal senses the one-handed operation signal triggered by the operation of the user holding the mobile terminal by one-handed by means of the touch electrodes arranged in the mobile terminal, the one-handed operation signal is a touch signal; when the mobile terminal senses the one-handed operation signal triggered by the operation of the user holding the mobile terminal by one-handed by means of the infrared detection pixels or the infrared transmitters and the infrared detectors arranged in the mobile terminal, the one-handed operation signal is an infrared signal; when the mobile terminal senses the one-handed operation signal triggered by the operation of the user holding the mobile terminal by one-handed by means of the myoelectric sensing devices arranged in the mobile terminal, the one-handed operation signal is a myoelectric signal. In the above embodiments, each of the above sensing devices follows its own principles. These principles may be understood from the above description for them in the above embodiments and thus are omitted herein.

In particular, the sensing of the touch electrodes may be known from the above description on the touch electrodes used as the one-handed operation sensing unit, that is, the above paragraphs for the embodiments as shown in FIGS. 3 and 9 in which the touch electrodes are used as the one-handed operation sensing unit. The sensing of the infrared detection pixels may be known from the above description on the infrared detection pixels used as the one-handed operation sensing unit, that is, the above paragraphs for the embodiments as shown in FIGS. 4 and 6 in which the infrared detection pixels are used as the one-handed operation sensing unit. The sensing of the infrared transmitters and the infrared detectors may be known from the above description on the infrared transmitters and the infrared detectors used as the one-handed operation sensing unit, that is, the above paragraphs for the embodiments as shown in FIGS. 10 and 12 in which the infrared transmitters and the infrared detectors are used as the one-handed operation sensing unit.

As an example, the above step S102 may include:

acquiring the holding position at which the user holds the mobile terminal by one-handed by a mobile terminal in response to the one-handed operation signal;

acquiring a pre-stored radius of the region in which a finger is able to access when the mobile terminal is held by one-handed, by the mobile terminal;

demagnifying an operation graphic interface displayed in full screen to one in a region being positioned on the basis of the position at which the user holds the display panel by one-handed and having a radius equal to said pre-stored radius and displaying the demagnified operation graphic interface in a predetermined one-handed operation comfortable region with the holding position as a center thereof, by the mobile terminal.

In particular, the one-handed operation signal includes information of all of points in an intersection region of the base of the thumb of the user and the mobile terminal (including the intersection region for direct contact and the intersection region for indirect contact), when the mobile terminal is held by the user with one-handed. In the example, the information of each point includes the coordinate position on the mobile terminal and the signal intensity of the point.

In general, as the central point in the above intersection region has maximum signal intensity, the central point in the above intersection region may in practice be used as the holding position at which the user holds the mobile terminal by one-handed.

Figure 14:
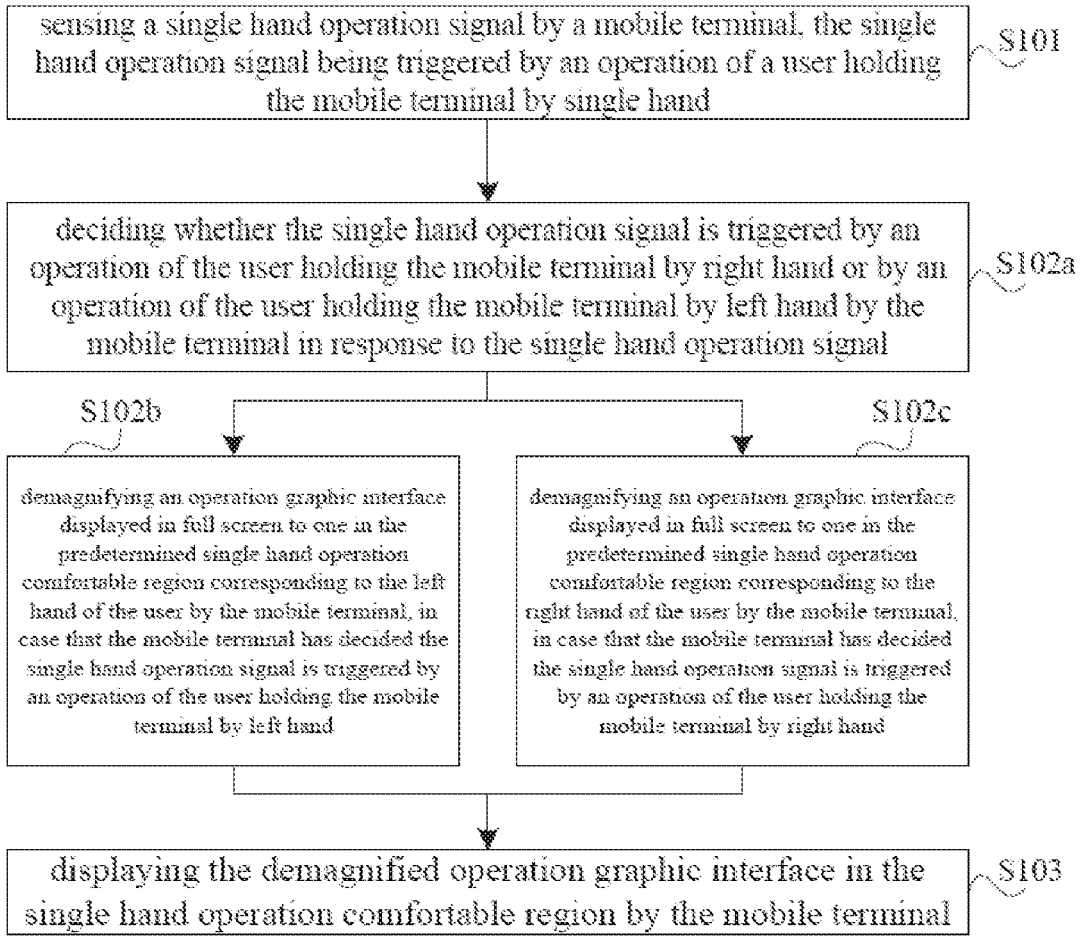
FIG. 14 is a second schematic flow chart showing a method for controlling a mobile terminal according to an embodiment of the present disclosure.

On the basis of FIG. 13, as illustrated in FIG. 14, in the method for controlling the mobile terminal provided by the an embodiment of the present disclosure, the above step S102 may include:

S102a: deciding whether the one-handed operation signal is triggered by an operation of the user holding the mobile terminal by right hand or by an operation of the user holding the mobile terminal by left hand, by the mobile terminal in response to the one-handed operation signal;

S102b: demagnifying an operation graphic interface to one in the one-handed operation comfortable region corresponding to the left hand of the user by the mobile terminal, in case that the mobile terminal has decided the one-handed operation signal is triggered by an operation of the user holding the mobile terminal by left hand; and S102c: demagnifying an operation graphic interface to one in the one-handed operation comfortable region corresponding to the right hand of the user by the mobile terminal, in case that the mobile terminal has decided the one-handed operation signal is triggered by an operation of the user holding the mobile terminal by right hand.

In the above step S102b, the one-handed operation comfortable region corresponding to the left hand of the user is a region being positioned on the basis of the position at which the user holds the display panel by the left hand and having a radius equal to a pre-stored radius of the region in which a finger is able to access when the mobile terminal is held by one-handed. In the above step S102c, the one-handed operation comfortable region corresponding to the right hand of the user is a region being positioned on the basis of the position at which the user holds the display panel by the right hand and having a radius equal to a pre-stored radius of the region in which a finger is able to access when the mobile terminal is held by one-handed. The pre-stored radius of the region in which the finger is able to access when the mobile terminal is held by one-handed may be the same value for the above step S102b and step S102c; otherwise, it may be the radius of the region in which the left thumb is able to access when the mobile terminal is held by the left hand of the user or the radius of the region in which the right thumb is able to access when the mobile terminal is held by the right hand of the user.

In particular, in the above step S102a, the mobile terminal may acquire information of all of points in the intersection region of the base of the thumb of the user and the mobile terminal from one-handed operation signal and may determine the coordinate positions of the point with maximum signal intensity on the mobile terminal from the information of these points and may then decide whether the user holds the mobile terminal by the left hand or by the right hand, on the basis of the coordinate positions of the point with the maximum signal intensity on the mobile terminal, that is, decide whether the one-handed operation signal is triggered by the operation of the user holding the mobile terminal by the left hand or is triggered by the operation of the user holding the mobile terminal by the right hand.

As an example, in the method for controlling the mobile terminal provided by the embodiment of the present disclosure, after acquiring the information of all of points in the intersection region of the base of the thumb of the user and the mobile terminal, the mobile terminal may further acquire a waveform of the one-handed operation signal (the waveform is formed of the coordinate position of each point and the signal intensity of each point) from the information of these points, so as to decide whether the user holds the mobile terminal by the left hand or by the right hand from the information of these points and the waveform of the one-handed operation signal. In this way, it may improve the decision accuracy of the mobile terminal.

As an example, in a first embodiment, when the mobile terminal senses the one-handed operation signal triggered by the operation of the user holding the mobile terminal by one-handed by means of the touch electrodes arranged in the mobile terminal (in practice, the one-handed operation signal is the touch signal), the mobile terminal may decide whether the user holds the mobile terminal by the left hand or by the right hand from the touch signal triggered by the operation of the user holding the mobile terminal by one-handed.

In an example, in the first embodiment, as the mobile terminal may also sense the touch signal triggered by the display region due to the user touching the display screen, the mobile terminal needs to recognize such two touch signals and make corresponding responses. In particular, the mobile terminal may recognize such two touch signals and make corresponding responses from the information of all of touch points (including the coordinate positions of touch points on the mobile terminal and signal intensities of touch points) contained in the touch signal triggered by the user, or from the waveform of the touch signal derived from the information of all of touch points.

Figure 15:
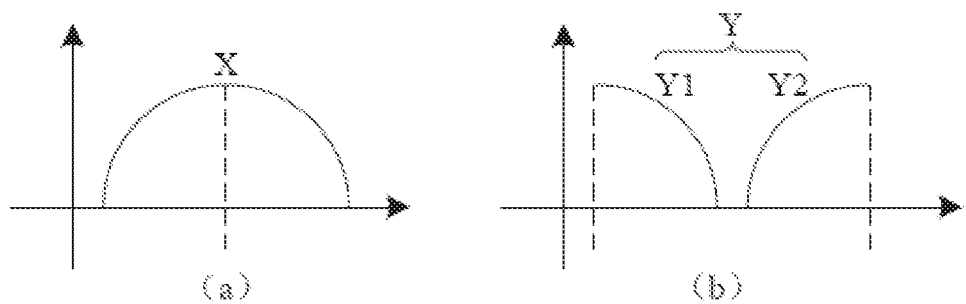
FIG. 15 is a schematic view showing waveforms of triggering signal provided by an embodiment of the present disclosure.

In an example, the mobile terminal may decide whether the touch signal is triggered by the operation of the user touching the display region of the display screen or triggered by the operation of the user holding the mobile terminal by one-handed on the basis of the waveform of the touch signal and decide whether the user holds the mobile terminal by the left hand or by the right hand upon deciding the touch signal is triggered by the operation of the user holding the mobile terminal by one-handed. If the touch signal triggered by the operation of the user touching the display region of the display screen is defined as a touch signal X and the touch signal triggered by the operation of the user holding the mobile terminal by one-handed is defined as a touch signal Y, the mobile terminal may decide from the waveforms of the touch signals which one of the touch signal X and the touch signal Y the received touch signal belongs to and make the response corresponding to the touch signal as the touch signal X and the touch signal Y have completely different waveforms. The waveform of the touch signal X is shown in FIG. 15(a). The user touch point at the center of the waveform of the touch signal X has maximum signal amplitude and the signal amplitudes at respective points decrease gradually from the touch point towards the point at either lateral end. The waveform of the touch signal Y is shown in FIG. 15(b). The touch signal Y has a waveform including a touch signal Y1 triggered by the operation of the user holding the mobile terminal by the left hand and a touch signal Y2 triggered by the operation of the user holding the mobile terminal by the right hand. In the waveform of the touch signal Y1, the maximum signal amplitude is located at the holding position at which the user holds the mobile terminal by the left hand and the closer the holding position is to the center of the display screen, the weaker the amplitude becomes. In the waveform of the touch signal Y2, the maximum signal amplitude is located at the holding position at which the user holds the mobile terminal by the right hand and the closer the holding position is to the center of the display screen, the weaker the amplitude becomes.

As an example, in the first embodiment, a device for enhancing the signal to noise ratio of the touch signal triggered by the operation of the user holding the mobile terminal by one-handed may be added in the mobile terminal. In this way, even if the base of the thumb fails to touch the mobile terminal when the user holds the mobile terminal by one-handed, the mobile terminal will sense the touch signal to further enhance sensitivity.

As an example, in a second embodiment, when the mobile terminal senses the one-handed operation signal triggered by the operation of the user holding the mobile terminal by one-handed by means of the infrared detection pixels arranged in the mobile terminal (in practice, the one-handed operation signal is an infrared signal), the mobile terminal may decide whether the user holds the mobile terminal by the left hand or by the right hand from the infrared signal triggered by the operation of the user holding the mobile terminal by one-handed.

In the second embodiment, the waveform of the infrared signal may be a pattern formed on the terminal mobile by being reflected by the thumb of the user.

As an example, in a third embodiment, when the mobile terminal senses the one-handed operation signal triggered by the operation of the user holding the mobile terminal by one-handed by means of the infrared transmitters and infra-red detectors arranged in the mobile terminal (in practice, the one-handed operation signal is an infrared signal), the mobile terminal may decide whether the user holds the mobile terminal by the left hand or by the right hand from the infrared signal triggered by the operation of the user holding the mobile terminal by one-handed.

In the third embodiment, the waveform of the infrared signal may be a pattern formed on the terminal mobile by being reflected by the thumb of the user.

FIG. 16 is a schematic view showing a pattern formed on the terminal mobile by being reflected by the thumb of the left hand of the user. The waveforms of the infrared signals in the second embodiment and the third embodiment may both be seen schematically from FIG. 16.

FIG. 16 only schematically shows an example of the pattern reflected by the left thumb of the user to the mobile terminal when the user holds the mobile terminal by the left hand. The pattern reflected by the right thumb to the mobile terminal when the user holds the mobile terminal by the right hand is similar to the pattern shown in FIG. 16, and thus the detailed description for the pattern reflected by the right thumb to the mobile terminal when the user holds the mobile terminal by the right hand is omitted herein.

As an example, in a fourth embodiment, when the mobile terminal senses the one-handed operation signal triggered by the operation of the user holding the mobile terminal by one-handed by means of the myoelectric sensing devices arranged in the mobile terminal (in practice, the one-handed operation signal is a myoelectric signal), the mobile terminal may decide whether the user holds the mobile terminal by the left hand or by the right hand from the myoelectric signal triggered by the operation of the user holding the mobile terminal by one-handed.

As an example, in the fourth embodiment, a device for enhancing the signal to noise ratio of the myoelectric signal triggered by the operation of the user holding the mobile terminal by one-handed may be added in the mobile terminal as the myoelectric signal transmitted by the user is typically relatively weak. In this way, when the user holds the mobile terminal by one-handed, the mobile terminal will sense the myoelectric signal accurately to further enhance sensitivity accuracy of the mobile terminal.

It should be noted that in the method for controlling the mobile terminal provided by the embodiment of the present disclosure, all of various embodiments need to be implemented by providing different function units and/or modules in the mobile terminal. For example, in the first embodiment, a touch signal processing unit in the mobile terminal configured to process the touch signal triggered by the operation of the user touching the display region of the display screen may be used to process the touch signal triggered by the operation of the user holding the mobile terminal by one-handed. In the above second and third embodiments, an infrared signal processing unit may be provided in the mobile terminal to process the infrared signal triggered by the operation of the user holding the mobile terminal by one-handed. In the above fourth embodiment, a myoelectric signal processing unit may be provided in the mobile terminal to process the myoelectric signal triggered by the operation of the user holding the mobile terminal by one-handed. For enhancing the signal to noise ratio in the above first embodiment and the fourth embodiment, such as an amplifier may be provided in the corresponding processing unit to achieve such function.

As an example, on the basis of FIG. 13, as shown in FIG. 17, after the above step S103, the method for controlling the mobile terminal provided by the embodiment of the present disclosure may further include:

S104: recovering the full screen display of the operation graphic interface from the demagnified operation graphic interface displayed in the one-handed operation comfortable region by the mobile terminal in case that the mobile terminal detects a first event.

In the example, the first event is that the user ends respective operations in the demagnified operation graphic interface displayed in the one-handed operation comfortable region, or that the user holds the mobile terminal by both hands, or that the mobile terminal fails to sense the one-handed operation signal within a predetermined period.

It should be noted that when the user ends the one-handed operation, or holds the mobile terminal by both hands, or the mobile terminal fails to sense the single operation signal within the predetermined period, that is, the user fails to hold the mobile terminal by one-handed within the predetermined period, the mobile terminal may recover the demagnified operation graphic interface in the one-handed operation comfortable region into a display in full screen. In this way, the operations of the user by one-handed may be switched freely, to improve the convenience of the mobile terminal.

As an example, in the method for controlling the mobile terminal provided by an embodiment of the present disclosure, a switch may be provided in software to determine whether the mobile terminal senses the one-handed operation signal triggered by the operation of the user holding the mobile terminal by one-handed or not. For example, a one-handed operation switch may be provided in an operation option and the user may activate the mobile terminal to sense the one-handed operation single triggered by the operation of the user holding the mobile terminal by one-handed by turning on the one-handed operation switch, or the user may deactivate the mobile terminal to sense the one-handed operation single triggered by the operation of the user holding the mobile terminal by one-handed by turning off the one-handed operation switch. It should be noted that in the embodiments of the present disclosure, when the mobile terminal senses the user to hold the mobile terminal by both hands, the mobile terminal maintains the operation graphic interface displayed in full screen; otherwise, when the mobile terminal senses the user to hold the mobile terminal by one-handed, the mobile terminal demagnifies the operation graphic interface displayed in full screen to one in a predetermined one-handed operation comfortable region being positioned on the basis of the holding position at which the user holds the mobile terminal and displays the demagnified operation graphic interface in the predetermined one-handed operation comfortable region.

An embodiment of the present disclosure provides a method for controlling a mobile terminal. The method includes: sensing a one-handed operation signal by a mobile terminal, the one-handed operation signal being triggered by an operation of a user holding the mobile terminal by one-handed; demagnifying an operation graphic interface displayed in full screen to one in a predetermined one-handed operation comfortable region by the mobile terminal in response to the one-handed operation signal, the predetermined one-handed operation comfortable region being positioned on the basis of a position at which the user holds the display panel; and displaying the demagnified operation graphic interface in the one-handed operation comfortable region by the mobile terminal.

In some embodiments, the one-handed operation sensing unit may include a plurality of infrared transmitters and a plurality of infrared detectors. For example, the infrared transmitters and the infrared detectors may be arranged alternately.

Figure 18:
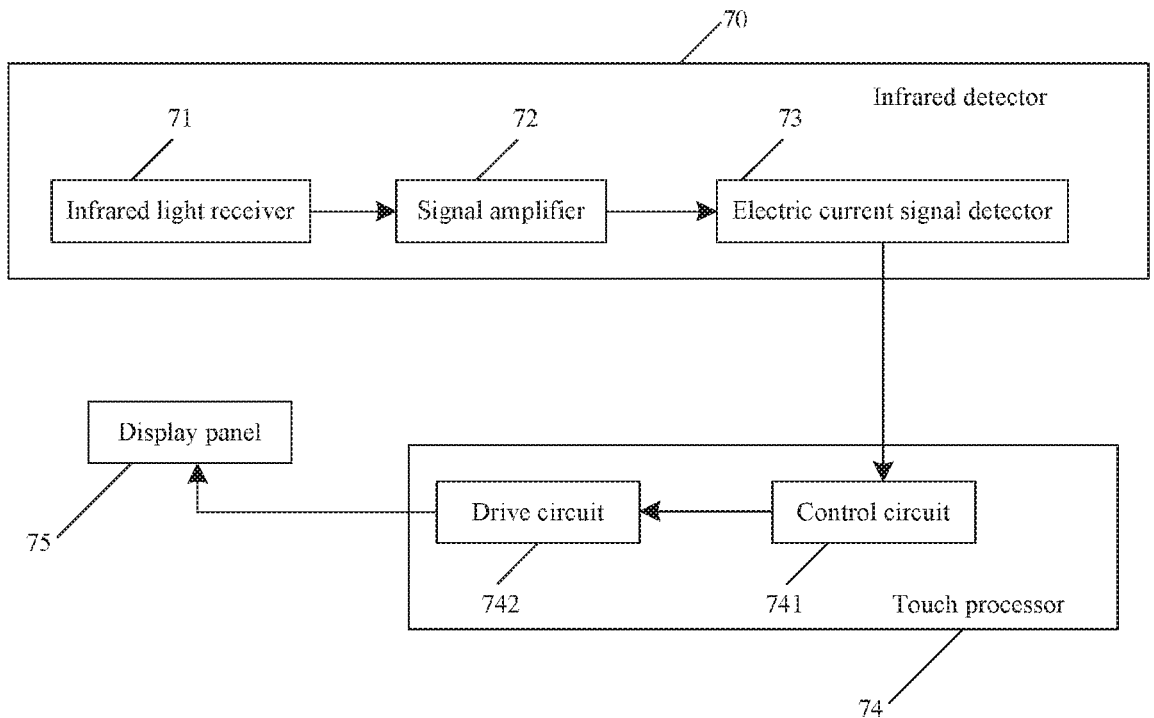
FIG. 18 is a block diagram of a mobile terminal according to some embodiments of the present disclosure.

As an example, as shown in FIG. 18, each infrared detector 70 may include: an infrared light receiver 71 configured to receive an infrared light reflected by a hand of the user and to convert the infrared light into an electric current signal; a signal amplifier 72 configured to amplify the electric current signal from the infrared light receiver 71; and an electric current signal detector 73 configured to detect the amplified electric current signal by the signal amplifier 72 to generate the touch signal. The electric current signal may change depending on intensity of infrared light received by the infrared detector.

Figure 19:
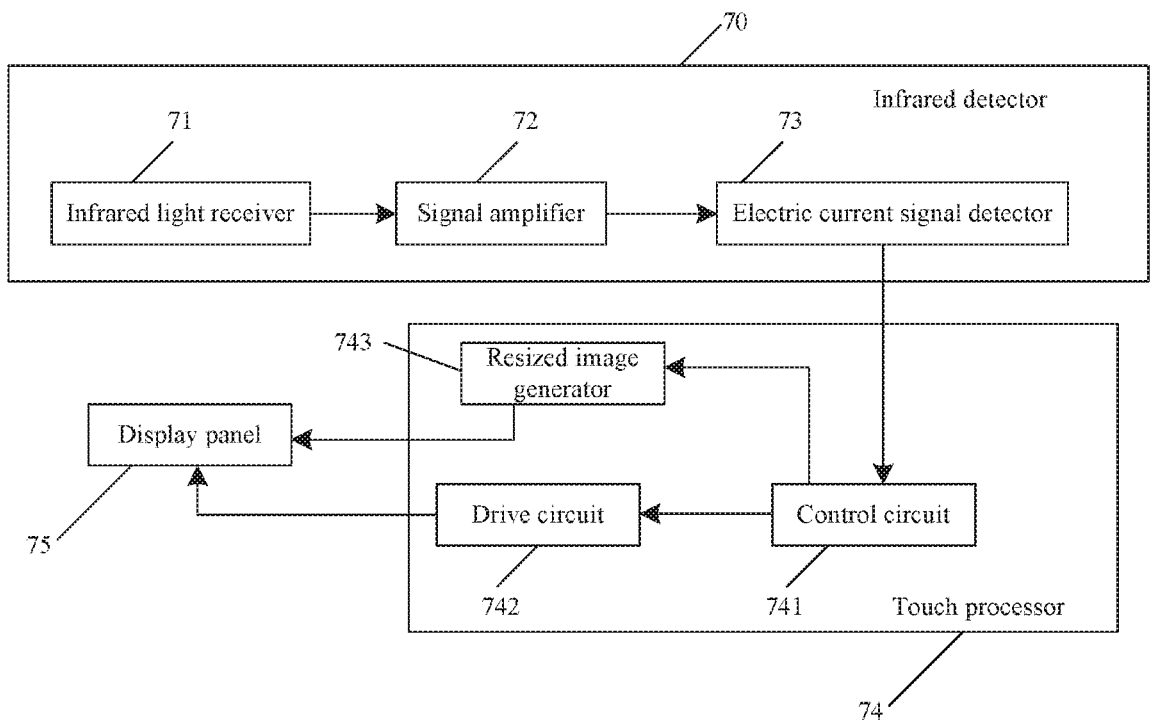
FIG. 19 is a block diagram of a mobile terminal according to still some embodiments of the present disclosure.
Figure 20:
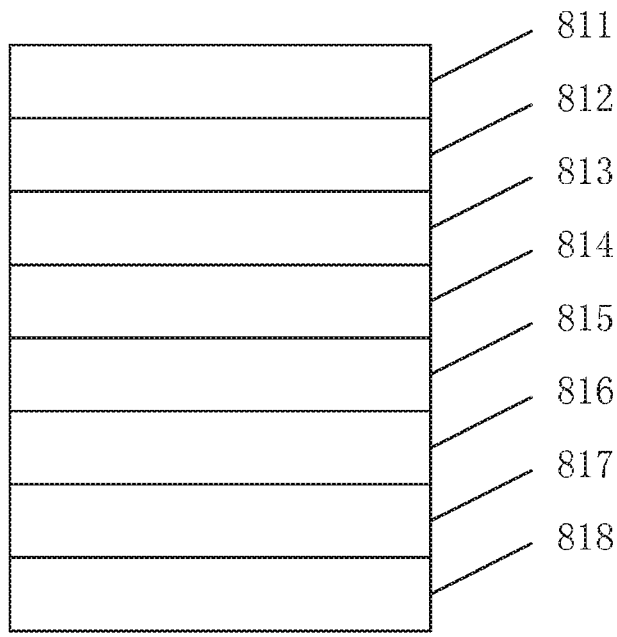
FIG. 20 is a schematic view of an infrared transmitter in a mobile terminal according to still some embodiments of the present disclosure.

In some embodiments, the mobile terminal may include a touch signal processor 74 configured to determine a one-handed operation comfortable region in the display region from the position at which the user holds the display panel and a pre-stored radius of a region operated by a finger in the one-handed holding operation configured to demagnify an operation graphic interface displayed in full-screen in the display region and to display the demagnified operation graphic interface in the one-handed operation comfortable region in the display region. As an example, as shown in FIG. 18, the touch signal processor 74 may include: a drive circuit 742 configured to drive display operation of the display panel 75; and a control circuit 741 configured to control the drive circuit 742 in response to the touch signal generated by the electric current signal detector 73. Alternatively, as shown in FIG. 19, the touch processor 74 may include: a resized image generator 743 configured to resize an image and output the resized image into the display panel 75. The control circuit 741 may be configured to control the resized image generator 743 to generate the resized image in response to the touch signal generated by the electric current signal detector 73.

In some embodiments, the touch signal processor 74 may be trained in advance to prevent other objects contacting the infrared detection region from being regarded as the hand of the user such that the sensing accuracy can be improved.

Figure 21:
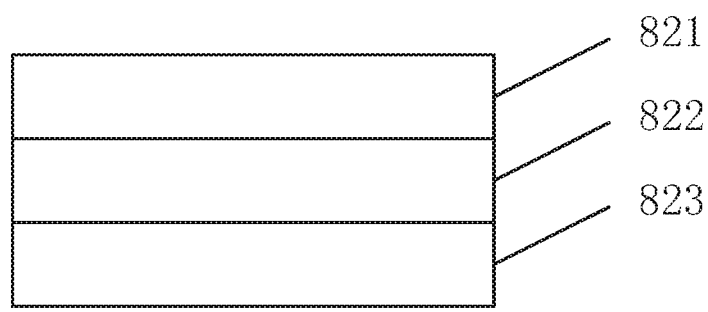
FIG. 21 is a schematic view showing an exemplified structure of an infrared detection pixel shown in FIG. 4.
Figure 22:
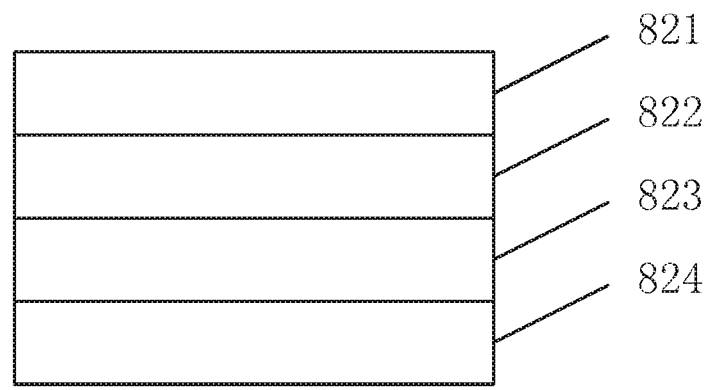
FIG. 22 is a schematic view showing another exemplified structure of an infrared detection pixel shown in FIG. 4.

In some embodiments, as shown in FIG. 21, the infrared light receiver 71 may include: a N type semiconductor layer 821, a P type semiconductor layer 823 and an infrared photo-sensitive material layer 822 sandwiched between the N type semiconductor layer 821 and the P type semiconductor layer 823. In a further example, as shown in FIG. 22, the infrared light receiver may further include a thin film transistor amplifier 824 on a side of the P type semiconductor layer distal to the N type semiconductor layer. The infrared photo-sensitive material layer 822 may be an organic material which may have single component or mixed component. The above structure shown in FIG. 21 may be called as a PIN type structure.

In operation of the one-handed operation sensing unit, when one hand of the user holds an edge of the mobile terminal, the infrared light receiver 71 may sense variation of the infrared light and convert it into variation of electric current. The electric current signal may be amplified by the signal amplifier and noises may be removed from the electric current signal. Then, the amplified electric current signal can be detected to obtain the variation of electric current caused by the variation of the infrared light. Finally, it may be determined from the variation of the electric current whether the mobile terminal is held by one hand or two hands of the user.

When the user holds the mobile terminal by one hand or by two hands, the intensity of the infrared light received by the infrared light receiver 71 (for example the infrared detection pixel 121 shown in FIG. 4 and FIG. 6) will change and thus the electric current signal generated by the infrared light receiver 71 will change. In the mobile terminal, a plurality of the infrared light receivers 71 (for example the infrared detection pixels) in an array are distributed. Each infrared light receiver may indicate a position. When the user changes his form of holding the mobile terminal (for example, by one hand or by two hands), the infrared light receivers at different positions will have different variations of electric current respectively. In some embodiments, values of variations of electric current of the infrared light receivers 71 in each row may be averaged. The row of the infrared light receivers 71 that has the maximum averaged values of variations of electric current among rows of the infrared light receivers 71 will be regarded to correspond to a central position where the hand holds the mobile terminal. The position can be determined by operation of addressing the infrared light receivers 71 (for example the infrared detection pixels 121) by means of the control circuit. The resized image generator 743 may magnify or demagnify original images in and output the resized image into the display panel such that the resized image can be displayed on the screen of the display panel. Typically, the resized image for one hand operation may cover a range that a finger can access, for example a range of about 10 cm in radius. In some embodiments, the scale of magnifying or demagnifying images may be set depending on requirements of the user, for example, length of the finger. The scale may for example be adjusted automatically.

In some embodiments, the infrared detection pixel shown in FIG. 4 and FIG. 6 may include a substrate 818, an anode 817, a hole injection layer 816, a hole transporting layer 815, a R(red)/G(green)/B(blue)/infrared light emitting layer 814, a hole blocking layer 813, an electron injection layer 812 and a cathode 811 sequentially stacked in a direction perpendicular to the substrate. Each infrared detection pixel may be controlled by a thin film transistor circuit. For the infrared light emitting layer, it may be an organic infrared light emitting layer. Typically, the infrared light has a wavelength in a range of 760 nm to 2500 nm. The organic infrared light emitting layer may for example be selected from an organic micro-molecule layer, an organic metal complex layer, a mixed inorganic and organic layer or a phosphorescent material layer.

With the above solutions, in the embodiments of the present disclosure, the one-handed operation signal triggered by the operation of the user holding the mobile terminal by one-handed may be sensed when the user holds the mobile terminal by one-handed and the operation graphic interface displayed in full screen may be demagnified and displayed in the predetermined one-handed operation comfortable region being positioned on the basis of the holding position in response to the one-handed operation signal. In this way, the user may perform one-handed operation on the operation graphic interface in the one-handed operation comfortable region and thus may perform one-handed operation on the large-scale mobile terminal to improve the convenience of the mobile terminal.

The above embodiments are only given by way of examples, instead of limiting the protection scope of the present disclosure. It would be appreciated by those skilled in the art that various changes, modifications or equivalents of the above embodiments will also fall within the scope of the present disclosure, without departing from the principles and spirit of the disclosure.

Therefore, the scope of the present disclosure is defined by the appended claims.

What is claimed is:

1. A mobile terminal comprising:
a display panel, comprising a first substrate and a second substrate arranged opposite to the first substrate, the first substrate or the second substrate comprising a display region and a peripheral region beside the display region;
a border arranged at a peripheral side of the display panel and configured to surround the display panel; and
a one-handed operation sensing unit arranged on the border, wherein the one-handed operation sensing unit comprises a plurality of infrared transmitters and a plurality of infrared detectors which are arranged on the border, and the one-handed operation sensing unit is configured to sense a one-handed holding operation of a user and a position at which the user holds the display panel and to send a touch signal in response to the one-handed holding operation of the user; and
a touch signal processor configured to determine a one-handed operation comfortable region in the display region from the position at which the user holds the display panel and a pre-stored radius of a region operated by a finger in the one-handed holding operation, and configured to demagnify an operation graphic interface displayed in full-screen in the display region and to display the demagnified operation graphic interface in the one-handed operation comfortable region in the display region, in response to the touch signal,
wherein the one-handed operation sensing unit is arranged on a side of the border, the side of the border facing towards a side of the peripheral region, and the display panel, the one-handed operation sensing unit and the border are arranged in sequence along a direction parallel to a display surface of the display panel.

2. The mobile terminal according to claim 1, wherein the border has transparent parts at positions corresponding to the infrared transmitters and the infrared detectors.

3. The mobile terminal according to claim 2, wherein the infrared transmitters and the infrared detectors are arranged alternately.

4. The mobile terminal according to claim 2, wherein each of the plurality of infrared detectors comprises:
an infrared light receiver configured to receive an infrared light reflected by a hand of the user and to convert the infrared light into an electric current signal;
a signal amplifier configured to amplify the electric current signal from the infrared light receiver, the electric current signal changing depending on intensity of infrared light received by the plurality of infrared detectors; and
an electric current signal detector configured to detect the amplified electric current signal by the signal amplifier to generate the touch signal, and
wherein the touch signal processor further comprises:
a drive circuit configured to drive display operation of the display panel; and
a control circuit configured to control the drive circuit in response to the touch signal generated by the electric current signal detector.

5. The mobile terminal according to claim 4, wherein the infrared light receiver comprises:
a N type semiconductor layer, a P type semiconductor layer and an infrared photo-sensitive material layer sandwiched between the N type semiconductor layer and the P type semiconductor layer.

6. The mobile terminal according to claim 5, wherein the infrared light receiver further comprises:
a thin film transistor amplifier on a side of the P type semiconductor layer distal to the N type semiconductor layer.

7. The mobile terminal according to claim 4, wherein the touch processor further comprises:
a resized image generator configured to resize an image and output the resized image into the display panel, and
wherein the control circuit is configured to control the resized image generator to generate the resized image in response to the touch signal generated by the electric current signal detector.

8. The mobile terminal according to claim 1, wherein the one-handed operation sensing unit includes a myoelectric sensing device provided onto the border.

9. A method for controlling the mobile terminal according to claim 1, the method comprising:
sensing a one-handed operation signal by the mobile terminal, the one-handed operation signal being triggered by an operation of a user holding the mobile terminal with one hand;
demagnifying an operation graphic interface displayed in full screen to a demagnified operation graphic interface in a predetermined one-handed operation comfortable region by the mobile terminal in response to the one-handed operation signal, the predetermined one-handed operation comfortable region being positioned on a basis of a position at which the user holds the display panel; and
displaying the demagnified operation graphic interface in the one-handed operation comfortable region by the mobile terminal,
wherein the one-handed operation sensing unit is arranged on the peripheral region of the first substrate or the second substrate.

10. The method according to claim 9, wherein demagnifying an operation graphic interface displayed in full screen to a demagnified operation graphic interface in a predetermined one-handed operation comfortable region by the mobile terminal in response to the one-handed operation signal comprises:
deciding whether the one-handed operation signal is triggered by an operation of the user holding the mobile terminal right-handed or by an operation of the user holding the mobile terminal left-handed, by the mobile terminal in response to the one-handed operation signal;

demagnifying the operation graphic interface displayed in full screen to the demagnified operation graphic interface in the predetermined one-handed operation comfortable region corresponding to a right hand of the user by the mobile terminal, in response to the mobile terminal deciding that the one-handed operation signal is triggered by an operation of the user holding the mobile terminal right-handed; and demagnifying the operation graphic interface displayed in full screen to the demagnified operation graphic interface in the predetermined one-handed operation comfortable region corresponding to a left hand of the user by the mobile terminal, in response to the mobile terminal deciding that the one-handed operation signal is triggered by an operation of the user holding the mobile terminal left-handed.

11. The method according to claim 9, further comprising:

recovering the full screen display of the operation graphic interface from the demagnified operation graphic interface displayed in the one-handed operation comfortable region by the mobile terminal in case that the mobile terminal detects a first event, wherein the first event is that the user completes respective operations in the demagnified operation graphic interface displayed in the one-handed operation comfortable region, or that the user holds the mobile terminal by both hands, or that the mobile terminal fails to sense the one-handed operation signal within a predetermined period.

12. The method according to claim 10, further comprising:

recovering the full screen display of the operation graphic interface from the demagnified operation graphic interface displayed in the one-handed operation comfortable region by the mobile terminal in case that the mobile terminal detects a first event, wherein the first event is that the user completes respective operations in the demagnified operation graphic interface displayed in the one-handed operation comfortable region, or that the user holds the mobile terminal by both hands, or that the mobile terminal fails to sense the one-handed operation signal within the predetermined period.

13. A mobile terminal comprising:

a display panel, comprising a first substrate and a second substrate arranged opposite to the first substrate, the first substrate or the second substrate comprising a display region and a peripheral region beside the display region;

a cover plate arranged above the display panel;

a one-handed operation sensing unit arranged between the peripheral region of the display panel and the cover plate, wherein the one-handed operation sensing unit comprises a plurality of touch electrodes which are arranged on a side of the cover plate facing the display panel and corresponding to the peripheral region of the display panel, an orthographic projection of the one-handed operation sensing unit onto the display panel falls within the peripheral region and falls out of the display region, and the one-handed operation sensing unit is configured to sense a one-handed holding operation of a user and a position at which the user holds the display panel and to send a touch signal in response to the one-handed holding operation of the user; and a touch signal processor configured to determine a one-handed operation comfortable region in the display region from the position at which the user holds the display panel and a pre-stored radius of a region operated by a finger in the one-handed holding operation configured to demagnify an operation graphic interface displayed in full-screen in the display region and to display the demagnified operation graphic interface in the one-handed operation comfortable region in the display region, in response to the touch signal.

14. The mobile terminal according to claim 13, wherein the touch electrodes are arranged on a curved portion on the cover plate.

15. The mobile terminal according to claim 13, wherein the one-handed operation sensing unit comprises a plurality of infrared transmitters and a plurality of infrared detectors which are arranged on a side of the cover plate facing the display panel and correspond to the peripheral region of the display panel, and wherein the cover plate has transparent parts at positions corresponding to the infrared transmitters and the infrared detectors.

16. The mobile terminal according to claim 15, wherein the infrared transmitters and the infrared detectors are arranged alternately.

17. The mobile terminal according to claim 15, wherein each of the plurality of infrared detectors comprises:

an infrared light receiver configured to receive an infrared light reflected by a hand of the user and to convert the infrared light into an electric current signal;

a signal amplifier configured to amplify the electric current signal from the infrared light receiver, the electric current signal changing depending on intensity of infrared light received by the plurality of infrared detectors; and an electric current signal detector configured to detect the amplified electric current signal by the signal amplifier to generate the touch signal, and wherein the touch signal processor further comprises:

a drive circuit configured to drive display operation of the display panel; and a control circuit configured to control the drive circuit in response to the touch signal generated by the electric current signal detector.

18. The mobile terminal according to claim 17, the touch processor further comprises:

a resized image generator configured to resize an image and output the resized image into the display panel, wherein the control circuit is configured to control the resized image generator to generate the resized image in response to the touch signal generated by the electric current signal detector.

19. A mobile terminal comprising:

a display panel, comprising a first substrate and a second substrate arranged opposite to the first substrate, the first substrate or the second substrate comprising a display region and a peripheral region beside the display region;

a border arranged at a peripheral side of the display panel and configured to surround the display panel; and a one-handed operation sensing unit arranged on the border, wherein the one-handed operation sensing unit comprises a plurality of infrared transmitters and a plurality of infrared detectors which are arranged on the border, and the one-handed operation sensing unit is configured to sense a one-handed holding operation of a user and a position at which the user holds the display panel and to send a touch signal in response to the one-handed holding operation of the user; and a touch signal processor configured to determine a one-handed operation comfortable region in the display region from the position at which the user holds the display panel and a pre-stored radius of a region operated by a finger in the one-handed holding operation configured to demagnify an operation graphic interface displayed in full-screen in the display region and to display the demagnified operation graphic interface in the one-handed operation comfortable region in the display region, in response to the touch signal, wherein the one-handed operation sensing unit is arranged on a side of the border, the side of the border facing away from a side of the display panel, and the display panel, the border and the one-handed operation sensing unit are arranged in sequence along a direction parallel to a display surface of the display panel.

\* \* \* \* \*